US012590022B2

(12) United States Patent
Kim et al.

(10) Patent No.: US 12,590,022 B2
(45) Date of Patent: Mar. 31, 2026

(54) HOME TOILET WASTE TREATMENT SYSTEM COMPRISING BIO-TREATMENT DEVICE AND COMBUSTION DEVICE, AND METHOD FOR TREATING TOILET WASTE BY USING SAME

(71) Applicant: Samsung Electronics Co., Ltd., Suwon-si (KR)

(72) Inventors: Nagjong Kim, Suwon-si (KR); Ginam Kim, Suwon-si (KR); Wonsuk Chang, Suwon-si (KR); Seungsik Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 573 days.

(21) Appl. No.: 17/927,079

(22) PCT Filed: May 12, 2021

(86) PCT No.: PCT/KR2021/005950
§ 371 (c)(1),
(2) Date: Nov. 22, 2022

(87) PCT Pub. No.: WO2021/241922
PCT Pub. Date: Dec. 2, 2021

(65) Prior Publication Data
US 2023/0212049 A1 Jul. 6, 2023

Related U.S. Application Data

(60) Provisional application No. 63/030,759, filed on May 27, 2020.

(51) Int. Cl.
*C02F 9/00* (2023.01)
*B09B 3/40* (2022.01)
(Continued)

(52) U.S. Cl.
CPC .................. *C02F 9/00* (2013.01); *B09B 3/40* (2022.01); *B09B 2101/25* (2022.01); *C02F 1/32* (2013.01);
(Continued)

(58) Field of Classification Search
None
See application file for complete search history.

(56) References Cited

U.S. PATENT DOCUMENTS 3,474,468 A * 10/1969 Bayne .................. A47K 11/023
                                                      203/DIG. 16
3,725,963 A * 4/1973 Speer ................... A47K 11/023
                                                      4/111.4
(Continued)

FOREIGN PATENT DOCUMENTS

CN        102374543 A      3/2012
CN        105733620 A      7/2016
(Continued)

OTHER PUBLICATIONS

Translation for Takumi reference run 10/25.*
(Continued)

*Primary Examiner* — Jennifer Dieterle
(74) *Attorney, Agent, or Firm* — CANTOR COLBURN LLP

(57) ABSTRACT

Provided are a household toilet waste treatment system and a method of treating toilet waste using the same, the household toilet waste treatment system comprising a solid-liquid separation toilet, a biological treatment apparatus, a sterilization apparatus, and a combustion apparatus. The combustion apparatus complements a slow biological treatment apparatus to allow continuous treatment of the household toilet waste in a unit space without long-distance piping connections.

20 Claims, 12 Drawing Sheets

(51) Int. Cl.

| | |
|---|---|
| *B09B 101/25* | (2022.01) |
| *C02F 1/32* | (2023.01) |
| *C02F 1/78* | (2023.01) |
| *C02F 3/12* | (2023.01) |
| *C02F 3/28* | (2023.01) |
| *C02F 3/30* | (2023.01) |
| *C02F 11/04* | (2006.01) |
| *C02F 11/12* | (2019.01) |
| *C02F 103/00* | (2006.01) |

(52) U.S. Cl.
CPC .............. *C02F 1/78* (2013.01); *C02F 3/1215* (2013.01); *C02F 3/2866* (2013.01); *C02F 3/307* (2013.01); *C02F 11/04* (2013.01); *C02F 11/12* (2013.01); *C02F 2103/005* (2013.01); *C02F 2303/04* (2013.01)

(56) References Cited

U.S. PATENT DOCUMENTS

| | | | | |
|---|---|---|---|---|
| 3,774,555 A | * | 11/1973 | Turner | F23G 5/14 |
| | | | | 110/210 |
| 3,882,552 A | * | 5/1975 | Turner | E03D 5/016 |
| | | | | 4/321 |
| 4,093,505 A | * | 6/1978 | Tsuruta | B01D 1/0058 |
| | | | | 159/9.2 |
| 5,991,931 A | * | 11/1999 | Hawkins | A47K 11/023 |
| | | | | 4/111.4 |
| 6,139,744 A | * | 10/2000 | Spears | A47K 11/023 |
| | | | | 210/201 |
| 6,558,550 B1 | * | 5/2003 | Kelly | C02F 9/00 |
| | | | | 210/615 |
| 2004/0226494 A1 | | 11/2004 | West | |
| 2013/0319947 A1 | * | 12/2013 | Kennedy | C02F 1/24 |
| | | | | 210/151 |
| 2014/0157502 A1 | * | 6/2014 | Shoseyov | A47K 11/035 |
| | | | | 4/317 |
| 2020/0015636 A1 | * | 1/2020 | Warren | E03D 5/016 |

FOREIGN PATENT DOCUMENTS

| | | | | | |
|---|---|---|---|---|---|
| CN | 210215093 U | | 3/2020 | | |
| EP | 2762454 A1 | * | 8/2014 | ............ | B01D 53/38 |
| JP | 2000263018 A | | 9/2000 | | |
| JP | 2001259582 A | | 9/2001 | | |
| JP | 2002273490 A | | 9/2002 | | |
| JP | 2007229637 A | | 9/2007 | | |
| JP | 2008297783 | * | 12/2008 | | |
| KR | 101042543 B1 | | 6/2011 | | |
| KR | 101156190 B1 | | 6/2012 | | |
| KR | 20120069049 A | | 6/2012 | | |
| KR | 20120117525 A | | 10/2012 | | |
| KR | 101268605 B1 | | 5/2013 | | |
| KR | 101290306 B1 | | 7/2013 | | |
| KR | 101372653 B1 | | 3/2014 | | |
| KR | 101594536 B1 | | 2/2016 | | |
| KR | 20190063060 A | | 6/2019 | | |
| KR | 20190106196 A | | 9/2019 | | |
| WO | WO-2015072207 A1 | * | 5/2015 | ............ | C02F 3/006 |
| WO | 2017149035 A1 | | 9/2017 | | |
| WO | 2021241842 A | | 12/2021 | | |
| WO | 2021241857 A1 | | 12/2021 | | |

OTHER PUBLICATIONS

Translation JP2008297783 10/25.*

Office Action issued Jan. 30, 2025 of KR Patent Application No. 10-2022-7034292.

Office Action issued Nov. 29, 2024 of CN Patent Application No. 202180060313.4.

Blanca Jimenez et al., "Helminths and their Role in Environmental Engineering"10.5772/62673(Chapter 3), Human Helminthiasis ǁ (2017). https://www.intechopen.com/books/human-helminthiasis/helminths-and-their-role-in-environmental-engineering.

Reinvented Toilet Technology in Development, HTClean Helbling With Gates Foundation high Temperature Processing Reinvented Toilet https://sanitation.ansi.org/HTClean.

Reinvented Toilet Technology in Development, Nanomembrane Toilet/ Cranfield University Dry Combustion Reinvented Toilet https://sanitation.ansi.org/NanomembraneToilet.

Yeon Jung Jung et al., "Synergistic effect of sequential or combined use of ozone and UV radiation for the disinfection of Bacillus subtilis spores", Water Research 42 (2008) 1613-1621.

Doulaye Kone et al, "Partnerships Chain To Launch the Toilet Industry" World Toilet Summit, Expo. 2019.

Reinvented Toilet Technology in Development, The Toronto Toilet University of Toronto (UT) Dry combustion Reinvented Toilet https://sanitation.ansi.org/TorontoToilet.

Extended European Search Report issued May 22, 2024 of EP Patent Application No. 21813073.0.

Joan Colón et al., "Anaerobic digestion of undiluted simulant human excreta for sanitation and energy recovery in less-developed countries", Energy for Sustainable Development 29, 57-64. (2015).

Roni Penn et al., "Review of synthetic human faeces and faecal sludge for sanitation and wastewater research", Water Research 132, 222-240. (2018).

* cited by examiner

(AD-mAO effluent)

Ozonized Air

HOME TOILET WASTE TREATMENT SYSTEM COMPRISING BIO-TREATMENT DEVICE AND COMBUSTION DEVICE, AND METHOD FOR TREATING TOILET WASTE BY USING SAME

CROSS REFERENCE TO RELATED APPLICATIONS

This application is a National Stage application of PCT/KR2021/005950, filed May 12, 2021, which claims the benefit of U.S. Provisional Application No. 63/030,759, filed May 27, 2020, the contents of which in their entirety are herein incorporated by reference.

TECHNICAL FIELD

Provided are a household toilet waste treatment system comprising a biological treatment apparatus and a combustion apparatus and a method of treating toilet waste by using the same.

BACKGROUND ART

About 2.3 billion people of the world population are known to live in an environment not having a basic toilet. Accordingly, a large number of people are known to be exposed to a polluted environment. In particular, many urban poor people in underdeveloped countries not having sewage facilities use contaminated water as drinking water. Therefore, in underdeveloped countries not having sewage facilities or even in development countries, separate houses having been requiring an eco-friendly toilet system that enables self-purification of excretion.

There are public toilet systems that proceeds biotreatment processes only. However, a public toilet system of the related art treats toilet waste at a slow rate during a biotreatment process, and thus an excessively large system is required to solve the problem, and it was not possible to completely decompose solids.

Therefore, even by the related art, there is a need for an alternative household toilet waste treatment system.

SUMMARY

An aspect provides a household toilet waste treatment system comprising: a solid-liquid separation toilet 100 for separating toilet waste into liquid toilet waste and solid toilet waste; a biological treatment apparatus 120 for biologically treating the liquid toilet waste transported from the solid-liquid separation toilet 100; a sterilization apparatus 140 for sterilizing the biotreated liquid waste transported from the biological treatment apparatus 120; and a combustion apparatus 164 for combustion of the solid toilet waste transported from the solid-liquid separation toilet 100 and the biotreated solid waste transported from the biological treatment apparatus 120.

Another aspect provides a household toilet waste treatment system comprising: a solid-liquid separation toilet 100 for separating toilet waste into liquid toilet waste and solid toilet waste; a biological treatment apparatus 120 for biologically treating the liquid toilet waste transported from the solid-liquid separation toilet 100; an anaerobic digestion bioreactor 180 for biologically treating the solid toilet waste transported from the solid-liquid separation toilet 100 under anaerobic conditions; a sterilization apparatus 140 for sterilizing the biotreated liquid waste transported from the biological treatment apparatus 120; and a combustion apparatus 164 for combustion of the anaerobically digested solid toilet waste transported from the anaerobic digestion bioreactor 180 and the biotreated solid toilet waste transported from the biological treatment apparatus 120.

Another aspect provides a method of treating toilet waste, the method comprising: separating toilet waste into liquid toilet waste and solid toilet waste by throwing toilet waste into a solid-liquid separation toilet; transporting the separated solid toilet waste to a combustion apparatus for combustion and transporting the separated liquid toilet waste to a biological treatment apparatus for biotreatment; transporting the biotreated liquid waste to a sterilization apparatus for sterilization; transporting a part of sludge of the biotreated liquid waste to the combustion apparatus and transportation a part of the sludge to an anoxic bioreactor of the biological treatment apparatus to be supplemented with a microorganism.

Another aspect provides a method of treating toilet waste, the method comprising: separating toilet waste into liquid toilet waste and solid toilet waste by throwing toilet waste into a solid-liquid separation toilet; transporting the separated solid toilet waste to an anaerobic digestion bioreactor for anaerobic digestion; transporting the liquid toilet waste separated at the step of separation and the liquid waste solubilized at the step of anaerobic digestion to a biological treatment apparatus for biotreatment; transporting the biotreated liquid waste to a sterilization apparatus for sterilization; transporting a part of sludge of the liquid waste biotreated at the step of biotreatment to the combustion apparatus for combustion and transporting a part of the sludge to an anoxic bioreactor of the biological treatment apparatus to be supplemented with a microorganism; and transporting sludge obtained at the step of anaerobic digestion to the combustion apparatus for combustion.

BRIEF DESCRIPTION OF THE DRAWINGS

FIG. 3 is a diagram schematically showing an example of a household toilet waste treatment system comprising an anaerobic digestion bioreactor 180'.

FIG. 5 is a diagram schematically showing an example of a household toilet waste treatment system comprising an anaerobic digestion bioreactor.

DETAILED DESCRIPTION

Figure 1:
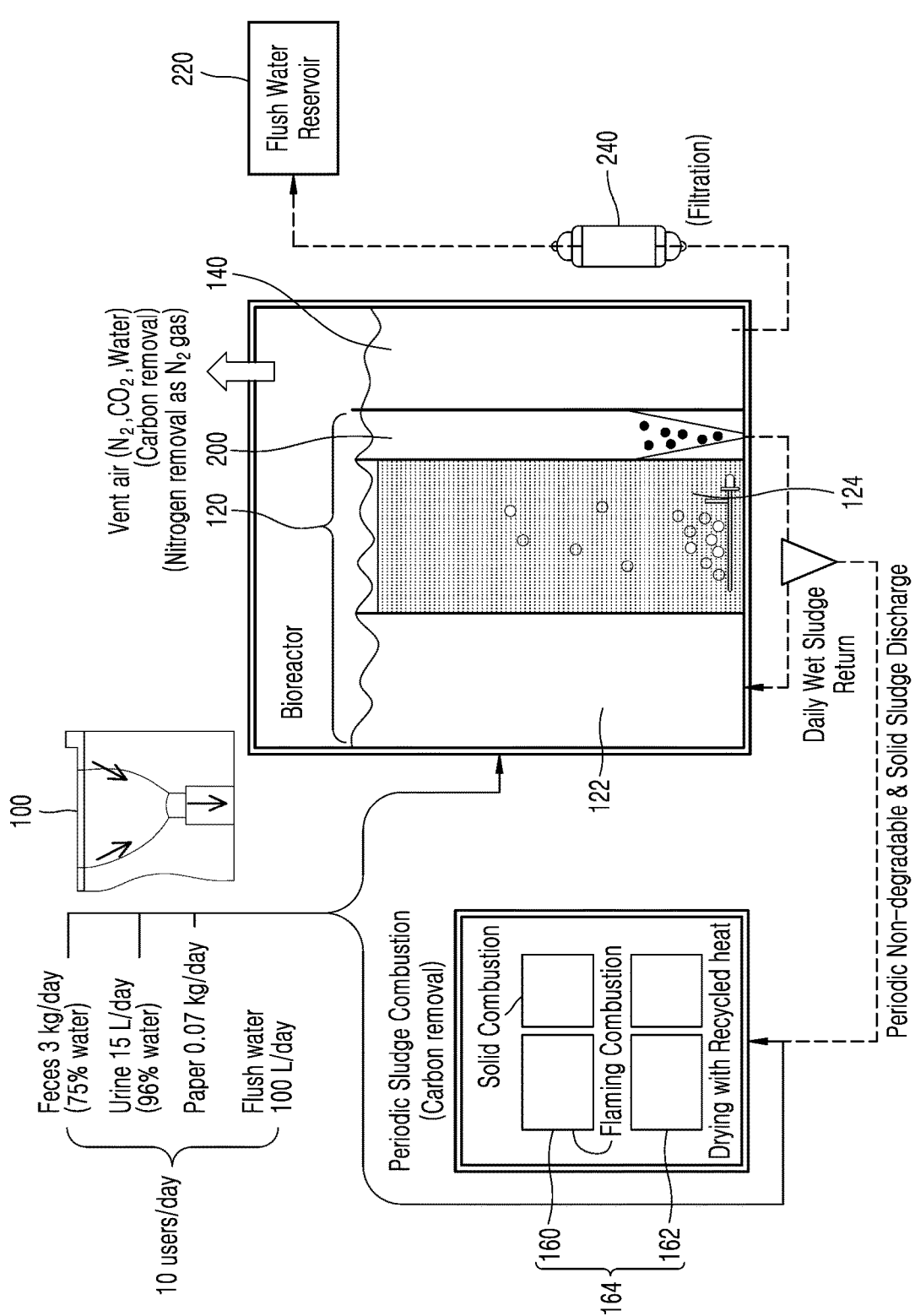
FIG. 1 is a diagram schematically showing an example of a household toilet waste treatment system.

An aspect provides a household toilet waste treatment system comprising: a solid-liquid separation toilet 100 for separating toilet waste into liquid toilet waste and solid toilet waste; a biological treatment apparatus 120 for biologically treating the liquid toilet waste transported from the solid-liquid separation toilet 100; a sterilization apparatus 140 for sterilizing the biotreated liquid waste transported from the biological treatment apparatus 120; and a combustion apparatus 164 for combustion of the solid toilet waste transported from the solid-liquid separation toilet 100 and the biotreated solid waste transported from the biological treatment apparatus 120.

In the present specification, the term "toilet waste" may include feces, urine, or a combination thereof. The toilet waste may further include toilet paper, flush water, or a combination thereof.

In the household toilet waste treatment system, the solid-liquid separation toilet may comprise a liquid collecting unit for accommodating the separated liquid toilet waste and a solid collecting unit for accommodating the separated solid toilet waste. The liquid collecting unit may be connected to the biological treatment apparatus. The solid collecting unit may be connected to the combustion apparatus. The liquid toilet waste collected in the liquid collecting unit may be continuously transported to the biological treatment apparatus, or may be stored in a liquid toilet waste reservoir and then transported to the biological treatment apparatus. Thus, the household toilet waste treatment system may comprise a liquid toilet waste reservoir that is connected to and arranged between the liquid collecting unit of the solid-liquid separation toilet and the biological treatment apparatus. In addition, the solid toilet waste collected in the solid collecting unit may be continuously transported to the combustion apparatus, or may be stored in a solid toilet waste reservoir and then transported to the combustion apparatus. Thus, the household toilet waste treatment system may comprise a solid toilet waste reservoir that is connected to and arranged between the solid collecting unit of the solid-liquid separation toilet and the combustion apparatus.

For example, the solid-liquid separation toilet 100 may include a body and a collecting member. The body may have an excrement transporting surface and an excrement isolating surface. The excrement transporting surface may be used for transporting the toilet waste. The excrement isolating surface may be provided below the excrement transporting surface. The excrement isolating surface may be used to separate the toilet waste provided from the excrement transporting surface into liquid waste and solid waste. The collection member may include a liquid collecting area for accommodating liquid waste and a solid collecting area for accommodating solid waste. The liquid waste may be transported to a buffer tank outside the solid-liquid separation toilet 100 by passing through the liquid collecting area. The solid toilet waste may be transported to a solid treatment apparatus (not shown) outside the solid-liquid separation toilet 100 by passing through the solid collecting area.

The solid-liquid separation toilet may be configured to have a solid separation rate and a liquid separation rate suitable for providing liquid toilet waste in an amount less than or equal to an average chemical oxygen demand (COD) amount that can be consumed in a bioreactor. For example, the solid-liquid separation toilet may be configured to have a solid separation rate and a liquid separation rate of 50% to 100%, respectively. The solid separation rate refers to a proportion of separating solid components of the introduced toilet waste into solids. The solid separation rate may be calculated as a proportion of a total content of solids separated from total suspended solids (TSS) among the introduced toilet waste. The liquid separation rate refers to a proportion of separating liquid components of the introduced toilet waste into liquids. The liquid separation rate may be calculated as a proportion of a total volume of the portion in which the total volume is separated into liquids among the introduced toilet waste. The solid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. In addition, the liquid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95% For example, the solid toilet waste may be separated at a separation rate of greater than or equal to 90% and transported to the combustion apparatus, and the liquid toilet waste may be separated at a separation rate of greater than or equal to 80% and transported to the biological treatment apparatus.

In the household toilet waste treatment system, the biological treatment apparatus may be a bioreactor, which does not comprise an anaerobic digestion bioreactor, or a combination thereof. The bioreactor that does not comprise an anaerobic digestion bioreactor may include an anaerobic bioreactor, an anoxic bioreactor, an oxic bioreactor, or a combination thereof. Such a combination may include a case where at least one anoxic bioreactor is connected with at least one oxic bioreactor so that liquid toilet waste treated in a former bioreactor is transported to a latter bioreactor to be continuously treated.

In addition, the biological treatment apparatus may include an anaerobic digestion (AD) bioreactor. The AD bioreactor may be arranged in combination with the bioreactor, which does not comprise an AD bioreactor, or a combination thereof. The AD bioreactor may be arranged in the front of the bioreactor, which does not comprise an AD bioreactor, or a combination thereof, so that the liquid toilet waste transported from the solid-liquid separation toilet may flow in and an organic matter may be solubilized by anaerobic digestion. The AD bioreactor may further comprise a precipitation tank connected thereto for precipitating the anaerobically digested liquid toilet waste transported from the AD bioreactor. The precipitation tank may be connected to the combustion apparatus to transport solid components precipitated in the liquid toilet waste to the combustion apparatus. The precipitation tank may be connected to a bioreactor, for example, a bioreactor, which does not comprise an AD bioreactor, or a combination thereof, to transport liquid components not precipitated in the liquid toilet waste to a subsequently connected bioreactor. The AD bioreactor may comprise a vent formed to discharge gas generated during the anaerobic digestion process. The gas may include $CH_4$, $CO_2$, or $N_2$ gas.

In the present specification, the term "biological treatment apparatus" refers to a bioreactor comprising microorganisms, and may comprise a device for converting liquid toilet waste into other compounds by the metabolic action of microorganisms. The bioreactor may have suitable oxygen conditions, such as anaerobic conditions, oxic conditions, or anoxic conditions, depending on a purpose of treatment. The bioreactor may comprise a stirrer for stirring a reaction mixture or providing oxygen, or an oxygen supplier. The oxygen supplier may be an air supply apparatus such as a sparger.

The term "anaerobic digestion bioreactor", "anaerobic bioreactor", "anoxic bioreactor", "oxic bioreactor", "partial nitrification bioreactor" or "anaerobic ammonium oxidation (Anammox) bioreactor", or "Anammox bioreactor" as used in the present specification may have, unless otherwise defined, the meaning known to one of ordinary skill in the art to which the claimed invention pertains. For example, the anaerobic digestion bioreactor may be configured to decompose a biodegradable organic matter by using a microorganism under anoxic conditions. The anaerobic digestion bioreactor may comprise a mixing apparatus as a reactor having an oxygen-blocked closed structure. Anaerobic digestion refers to a process of decomposing a biologically degradable organic matter into methane and carbon dioxide in the absence of oxygen molecules in the anaerobic digestion bioreactor. The solid toilet waste may be decomposed by the anaerobic digestion, and thus the amount thereof may be reduced. The anaerobic digestion may be generally performed in three steps: solubilization and hydrolysis; acid production; and methanogenesis. In the present specification, the anaerobic digestion may include not only complete anaerobic digestion, but also partial anaerobic digestion. The partial anaerobic digestion may be performed only through the solubilization and hydrolysis or the acid production out of the three steps. The household toilet waste treatment system comprises the combustion apparatus for combustion of the solid toilet waste, and thus the solid toilet waste may be treated in such a way. Therefore, there is no need to completely digest the solid toilet waste in the anaerobic digestion bioreactor and convert the solid toilet waste into biogas, such as methane and carbon dioxide. Rather, the solid toilet waste may rather be digested to an appropriate stage in consideration of the amount, cost, energy consumption, and the like. The residence time of the solid toilet waste in the anaerobic digestion bioreactor may vary depending on a targeted degree of the anaerobic digestion. For example, the residence time may refer to the time required for the solid toilet waste to be digested only through solubilization and hydrolysis, through up to acid production, or through all the way to the methanogenesis. The residence time may be, for example, about several days. In the anaerobic digestion bioreactor, a dissolved oxygen (DO) concentration may be about 0 mg/L or an oxidation-reduction potential (ORP) may be less than or equal to about −100 mV, for example, less than or equal to about −200 mV. The anaerobic digestion bioreactor may contain an aerobic digestion microorganism, which anaerobically digests an organic matter, or a mixture thereof. The microorganism may include an acid-producing microorganism, such as *Clostridium formicoaceticum* or *Acetobacterium woodi*. The microorganism may also include a methanogen, such as *Methanobacterium, Methanococcus, Methanosarcina, Methanospirillum*, or *Hydrogenotrophic* methanogen.

The anaerobic bioreactor may be used to accumulate high-molecular substances in a microorganisms for the purpose of excessive intake of phosphorus, and to secreting phosphorus. The anaerobic bioreactor may comprise a mixing apparatus as a reactor having an oxygen-blocked closed structure. The residence time of waste in the anaerobic bioreactor may refer to time sufficient for the excessive intake of phosphorus. The residence time may be, for example, several hours to about 1 day. In the anaerobic bioreactor, a DO concentration may be about 0 mg/L or an ORP may be less than or equal to about −100 mV, for example, less than or equal to about −200 mV. The anaerobic bioreactor may contain a microorganism that excessively intakes phosphorus into the body. The microorganism may be a phosphorus accumulating bacterium (PAB).

The anoxic bioreactor may be used to perform a denitrification reaction under stirring conditions without oxygen injection. The anoxic bioreactor may be a bioreactor in which oxygen is present in the headspace gas and dissolved oxygen is minutely present by having a mixing apparatus. The oxygen concentration may be regarded as DO in a range of about 0 mg/L to about 0.2 mg/L or ORP in a range of about −50 mV to about 50 mV. The anoxic bioreactor may contain a denitrifying microorganism.

The oxic bioreactor may refer to a bioreactor with a high DO concentration, and may be used to perform ammonia oxidation and nitrification. The oxic bioreactor may comprise an aerator that forcibly injects air or oxygen. The oxic bioreactor may contain ammonia-oxidizing bacteria (AOB), nitrite-oxidizing bacteria (NOB), or a combination thereof. In the oxic bioreactor, the oxygen concentration may be regarded as DO of greater than or equal to about 0.2 mg/L or ORP of greater than or equal to about 100 mV.

The partial nitrification bioreactor may be an oxic bioreactor in which ammonia nitrogen is oxidized only to nitrite nitrogen rather than to nitrate nitrogen. In the partial nitrification bioreactor, the AOB is dominant above all, and thus ammonia nitrogen may be oxidized only to nitrite nitrogen. For the dominance of AOB in the partial nitrification bioreactor, an environment in which the AOB is advantageous to survive and the NOB is difficult to survive may be formed. The nitrite produced in the partial nitrification bioreactor may be then transported to an Anammox bioreactor for denitrification.

The Anammox bioreactor may be a bioreactor in which ammonia is directly oxidized under anaerobic conditions. The Anammox bioreactor may contain an autotrophic denitrifying microorganism that can generate nitrogen gas by a reaction between ammonia nitrogen as an electron doner and nitrite as an electron acceptor under anoxic conditions. The autotrophic denitrifying microorganism is also called an Anammox bacterium. In the Anammox bioreactor, nitrite and ammonium can be directly converted into nitrogen gas and water as shown in the following formula:

$$NH_4^+ + NO_2^- \rightarrow N_2 + 2H_2O$$

The Anammox bacteria may belong to the phylum Planctomycetes. The Anammox bacteria may belong to the Brocadia genera, the Kuenenia genera, the Anammoxoglobus genera, the Jettenia genera, the Scalindua genera, or a combination thereof.

The oxygen concentration in the Anammox bioreactor may be similar to that in the anaerobic bioreactor or the anoxic bioreactor. The oxygen concentration may be, for example, regarded as DO of less than or equal to about 0.2 mg/L or ORP of less than or equal to about 150 mV.

The biological treatment apparatus may comprise: an anoxic bioreactor (A) and an oxic bioreactor (O) (hereinafter also referred to as 'AO'); an anoxic bioreactor (A), an oxic bioreactor (O), and an anoxic bioreactor (A); an anaerobic bioreactor, an anoxic bioreactor (A), and an oxic bioreactor (A) (hereinafter also referred to as 'AOA'); an anoxic bioreactor (A), an oxic bioreactor (O), an anoxic bioreactor (A), and an oxic bioreactor (O) (hereinafter also referred to as '4-step Bardenpho'); an anaerobic bioreactor, an oxic bioreactor (O), an anoxic bioreactor (A), an oxic bioreactor (O), and an anoxic bioreactor (A) (hereinafter also referred to as '5-step Bardenpho'); a modified University of Cape Town (MUCT) reactor; a University of Cape Town (UCT) reactor; a sequencing batch reactor; a partial nitrification bioreactor and an anammox bioreactor; an anammox biore-actor; or a combination thereof.

In the UCT bioreactor, an anaerobic bioreactor, an anoxic bioreactor, an oxic bioreactor, and a precipitation tank may be sequentially connected with one another, wherein the anoxic bioreactor may be connected to the anaerobic biore-actor so that a reaction product of the anoxic bioreactor can be returned to the front of the anaerobic bioreactor, and the oxic bioreactor may be connected to the anoxic bioreactor so that a reaction product of the oxic bioreactor can be returned to the front of the anoxic bioreactor. The precipitation tank may be connected to the anoxic bioreactor and the combus-tion apparatus so that a precipitate can be transported to the front of the anoxic bioreactor or to the combustion appara-tus.

The MUCT bioreactor refers to an UCT bioreactor in which the oxic bioreactor is divided into two anoxic biore-actors, i.e., a first anoxic bioreactor and a second anoxic bioreactor, and thus an anaerobic bioreactor, a first anoxic bioreactor, a second anoxic bioreactor, an oxic bioreactor, and a precipitation tank may be sequentially connected to one another, wherein the first anoxic bioreactor may be connected to the anaerobic bioreactor so that a reaction product of the first anoxic bioreactor can be returned to the front of the anaerobic bioreactor, and the oxic bioreactor may be connected to the second anoxic bioreactor so that a reaction product of the oxic bioreactor can be returned to the anoxic bioreactor. The precipitation tank may be connected to the second anoxic bioreactor and the combustion appa-ratus so that a precipitate can be transported to the second anoxic bioreactor or the combustion apparatus.

In the household toilet waste treatment system, the ster-ilization apparatus may be any sterilization apparatus com-monly known in the art to which the household toilet waste treatment system belongs. The sterilization apparatus may be connected to the bioreactor for use. The sterilization apparatus may be arranged with other elements of the household toilet waste treatment system in one building rather than in separate buildings.

The sterilization apparatus may be an apparatus provided with a sterilization medium. The sterilization medium may include steam, heat, radiation, plasma, ozone, vaporized hydrogen peroxide, vaporized peracetic acid, at least one gaseous disinfectant, at least one liquid disinfectant, or a filtration medium. The sterilization apparatus may comprise a heater, a radiation irradiator, an electrochemical steriliza-tion apparatus, or a filtration device. The electrochemical sterilization apparatus may comprise an electrode, and may induce electrochemical production of sterilization species by flowing a current to water through the electrode. The ster-ilization species may comprise species produced from water itself, such as ozone, or species produced from those dis-solved in water, such as those that oxidize chlorine ions to free chlorine. The sterilization apparatus may comprise, for example, an ozone generator, an ultraviolet irradiator, an ozone generator and an ultraviolet irradiator, a heater, a plasma generator, a filtration device, an electrochemical sterilization apparatus, or a combination thereof. The house-hold toilet waste treatment system may comprise a steril-ization bioreactor containing the biologically treated liquid toilet waste transported from the biological treatment appa-ratus, and the sterilization apparatus may be connected to the sterilization bioreactor for sterilization treatment.

In the household toilet waste treatment system, the com-bustion apparatus may comprise a container for containing the solid waste and a heater for applying heat to the solid waste in the container. The combustion apparatus may comprise a dryer for drying the solid waste before combus-tion of the waste. The combustion apparatus may comprise a fuel injector for injecting a fuel into the container and an igniter for igniting the fuel injected into the container. In addition, the combustion apparatus may comprise, sepa-rately from the container of the dryer, a container for containing the dried solid waste transported from the con-tainer of the dryer. The fuel may be biogas transported from the biological treatment apparatus or the anaerobic digestion bioreactor.

For example, the combustion apparatus 164 may com-prise a dewaterer, a dryer, and a sub-combustion device. The solid waste provided to the combustion device 164 may sequentially pass through the dewaterer, the dryer, and the sub-combustion device. The combustion apparatus may be configured as a unit connected to the dewaterer, the dryer, or both the dewaterer and the dryer. In this regard, the solid toilet waste containing moisture may be rapidly and effi-ciently removed by combustion. Accordingly, by removing a part of COD in the toilet waste through the combustion apparatus, the amount of influent COD into the bioreactor can be maintained at a level equivalent to or lower than the amount that can be consumed by the microorganism con-tained in the bioreactor. In this regard, the combustion apparatus may compensate for the slow disposal rate of the toilet waste by the bioreactor. The dewaterer may extract liquid components from the solid waste, so that the solid content in the solid waste may be in a range of about 25% to about 30%. The dryer may evaporate the liquid compo-nents of the solid waste, so that the solid content in the solid waste may be in a range of about 90% to about 100%. The sub-combustion device may combust the solid waste.

In the present specification, the term "combustion" may refer to not only complete combustion, but also partial combustion. The combustion may refer to not only flaming combustion, but also smouldering. The combusted solid waste may refer to, for example, ash or charcoal, of which a surface or a portion of the solid waste has been combusted.

The household toilet waste treatment system may further comprise a dewaterer for dewatering the solid toilet waste transported from the solid-liquid separation toilet to the combustion apparatus and the biotreated solid waste trans-ported from the biological treatment apparatus to the com-bustion apparatus. The dewaterer may comprise a squeezer, a filter, or a centrifuge. The solid waste transported from the biological treatment apparatus to the combustion apparatus may be non-biodegradable waste or biomass. The solid waste transported from the biological treatment apparatus to the combustion apparatus may be sludge or activated sludge. The dewaterer may be connected to the combustion appa-ratus to transport the dewatered solid waste to the combus-tion apparatus. The transport of the dewatered solid waste from the dewaterer to the combustion apparatus may be achieved by a conveying means, such as a conveyor belt, a screw, an auger, or a pump, or by a natural force such as gravity. The household toilet waste treatment system may include a conveying means, such as a conveyor belt, a screw, an auger, or a pump, connected thereto, so that the dewatered solid waste can be transported from the dewaterer to the combustion apparatus. The combustion apparatus may be an integrated with the dryer, or may be arranged separately from the dryer. When the dryer is arranged separately from the combustion apparatus, a device for transporting the dried solids may be included in the inside or at the rear end of the dryer.

Accordingly, the term "solid waste" as used in the present specification may refer to solid components, and may include not only completely dried solid waste, but also solid waste containing moisture at some extent. The moisture content in the solid waste may be, for example, in a range of 0% to 99%, 0% to 90%, 0% to 70%, 0% to 50%, 0% to 40%, 5% to 40%, 10% to 40%, 15% to 40%, 20% to 40%, or 10% to 30%. The dewaterer may be arranged between the solid-liquid separation toilet and combustion apparatus or between the biological treatment apparatus and the combustion apparatus. The dewaterer may exist separately from the combustion apparatus, or may exist by forming a unit together with the combustion apparatus. The unit may comprise, for example, a dewaterer and a sub-combustion device. The combustion apparatus may comprise a dewaterer, a dryer, and a sub-combustion device. The combustion apparatus may be continuously connected so that the solid toilet waste can be dewatered in the dewaterer, dried in the dryer, and combusted in the sub-combustion device. The dryer may comprise a heater, wherein the heater applies heat to the solid waste to evaporate the moisture. The dryer may be configured to perform sterilization in the process of moisture evaporation and heating.

The biological treatment apparatus may comprise a precipitation tank for precipitating the biotreated waste. The precipitation tank may comprise an inlet through which the biotreated waste can be introduced from the bioreactor of the biological treatment apparatus. In addition, the precipitation tank may be connected to the bioreactor of the biological treatment apparatus to return a precipitate to the bioreactor, and/or may be connected to the combustion apparatus to transport a precipitate to the combustion apparatus. The precipitation tank, the bioreactor, and/or the combustion apparatus may comprise a regulator, for example, a valve, for regulating a flow rate of water being transported.

In the household toilet waste treatment system, the biological treatment apparatus may be connected to a water reservoir so that the biotreated water can be transported to the water reservoir. The water reservoir may be a reservoir for flush water of the solid-liquid separation toilet. Accordingly, the household toilet waste treatment system may have a path for recycling water purified from toilet waste to be used as flush water.

The household toilet waste treatment system may further comprise a filter installed to filter the biotreated water transported from the biological treatment apparatus to the water reservoir.

In the household toilet waste treatment system, the biological treatment apparatus may comprise a vent formed to discharge gas generated in the biological treatment process. The gas may include $CO_2$, $CH_4$, or $N_2$ gas.

In an embodiment, the household toilet waste treatment system may comprise: the solid-liquid separation toilet 100 for separating toilet waste into liquid toilet waste and solid toilet waste; the biological treatment apparatus 120 for biologically treating the liquid toilet waste transported from the solid-liquid separation toilet 110; the sterilization apparatus 140 for sterilizing the biotreated liquid waste transported from the biological treatment apparatus 120; and the combustion apparatus 164 for combustion of the solid toilet waste transported from the solid-liquid separation toilet 110 and the biotreated solid waste transported from the biological treatment apparatus 120, wherein the biological treatment apparatus 120 may further comprise the precipitation tank for precipitating the biotreated waste, and the precipitation tank may comprise an inlet for introducing the biotreated waste from a bioreactor of the biological treatment apparatus 120, and may be connected to the bioreactor to return a precipitate to the bioreactor of the biological treatment apparatus 120 and/or may be connected to the combustion apparatus 164 to transport a precipitate to the combustion apparatus 164.

The sterilization apparatus may be any sterilization apparatus commonly known in the art to which the household toilet waste treatment system belongs. The sterilization apparatus may be connected to the bioreactor for use. The sterilization apparatus may be arranged with other elements of the household toilet waste treatment system in one building rather than in a separate building.

The sterilization apparatus may be an apparatus provided with a sterilization medium. The sterilization medium may include steam, heat, radiation, plasma, ozone, vaporized hydrogen peroxide, vaporized peracetic acid, at least one gaseous disinfectant, at least one liquid disinfectant, or a filtration medium. The sterilization apparatus may comprise a heater, a radiation irradiator, an electrochemical sterilization apparatus, or a filtration device. The electrochemical sterilization apparatus may comprise an electrode, and may induce electrochemical production of sterilization species by flowing a current to water through the electrode. The sterilization species may comprise species produced from water itself, such as ozone, or species produced from those dissolved in water, such as those that oxidize chlorine ions to free chlorine. The sterilization apparatus may comprise, for example, an ozone generator, an ultraviolet irradiator, an ozone generator and an ultraviolet irradiator, a heater, a plasma generator, a filtration device, an electrochemical sterilization apparatus, or a combination thereof. The sterilization apparatus may comprise a sterilization bioreactor for containing the biotreated liquid waste transported from the ozone generator, the ultraviolet irradiator, or ozone generator, and both from the ultraviolet irradiator and the biological treatment apparatus. The sterilization apparatus may be connected to the sterilization bioreactor to perform sterilization. In an embodiment, the combustion apparatus may comprise a container for containing the solid waste and a heater for applying heat to the solid toilet waste in the container. The combustion apparatus may comprise a dryer for drying the solid waste before combustion. The combustion apparatus may comprise a fuel injector for injecting fuel into the container of the combustion apparatus and an igniter for igniting the fuel injected into the container. In addition, the combustion apparatus may comprise, separately from the container of the dryer, a container for containing the dried solid waste transported from the container of the dryer.

In an embodiment, the biological treatment apparatus may be connected to a water reservoir so that the biotreated water can be transported to the water reservoir. The water reservoir may be a reservoir for flush water of the solid-liquid separation toilet. Accordingly, the household toilet waste treatment system may have a path for recycling water purified from toilet waste to be used as flush water. In an embodiment, the household toilet waste treatment system may further comprise a filter installed to filter the biotreated water transported from the biological treatment apparatus to the water reservoir.

In an embodiment, the biological treatment apparatus may comprise: an anoxic bioreactor (A) and an oxic bioreactor (O); an anoxic bioreactor (A), an oxic bioreactor (O), and an anoxic bioreactor (A); an anaerobic bioreactor, an anoxic bioreactor (A), and an oxic bioreactor (A); an anoxic bioreactor (A), an oxic bioreactor (O), an anoxic bioreactor (A), and an oxic bioreactor (O); an anaerobic bioreactor, an oxic bioreactor (O), an anoxic bioreactor (A), an oxic bioreactor (O), and an anoxic bioreactor (A); an MUCT bioreactor; an UCT bioreactor; a sequencing batch reactor; a partial nitrification bioreactor and an anammox bioreactor; an anammox bioreactor; or a combination thereof.

FIG. 1 is a diagram schematically showing an example of the household toilet waste treatment system. In FIG. 1, the household toilet waste treatment system comprises: a solid-liquid separation toilet 100; a biological treatment apparatus 120; a sterilization apparatus 140; a combustion apparatus 164; and a flush water reservoir 220. The solid-liquid separation toilet 100 may be connected to the biological treatment apparatus 120 to accommodate liquids of the toilet waste, and may be connected to the combustion apparatus 164 to accommodate solids of the toilet waste. The combustion apparatus 164 may comprise a sub-combustion device 160 and a dryer 162. The biological treatment apparatus 120 may comprise a compartment 122 comprising an anaerobic bioreactor, an anoxic bioreactor, or a combination thereof, an oxygen tank 124, and a precipitation tank 200. The compartment 122 comprising an anaerobic bioreactor, an anoxic bioreactor, or a combination thereof may be connected to the oxygen tank 124 so that the toilet waste treated in the compartment 122 can be transported to the oxygen tank 124. The oxygen tank 124 may be connected to the precipitation tank 200 so that the toilet waste treated in the oxygen tank 124 can be transport to the precipitation tank 200. The precipitation tank 200 may be connected to the anaerobic bioreactor, the anoxic bioreactor 122, or the combustion apparatus 164 so that a part of sludge precipitated in the precipitation tank 200 can be transported to the front of the anaerobic bioreactor or the anoxic bioreactor 122 or to the combustion apparatus 164. The precipitation tank 200 may be connected to the sterilization apparatus 140 so that the liquids of the toilet waste treated in the precipitation tank 200 can be transported to the sterilization apparatus 140. The sterilization apparatus 140 may be connected to the water reservoir 220 so that the toilet waste sterilized in the sterilization apparatus 140 can be transported to the flush water reservoir 220. A filter 240 may be connected between the sterilization apparatus 140 and the flush water reservoir 220 so that the toilet waste sterilized in the sterilization apparatus 140 may be filtered and then transported to the flush water reservoir 220.

Figure 2:
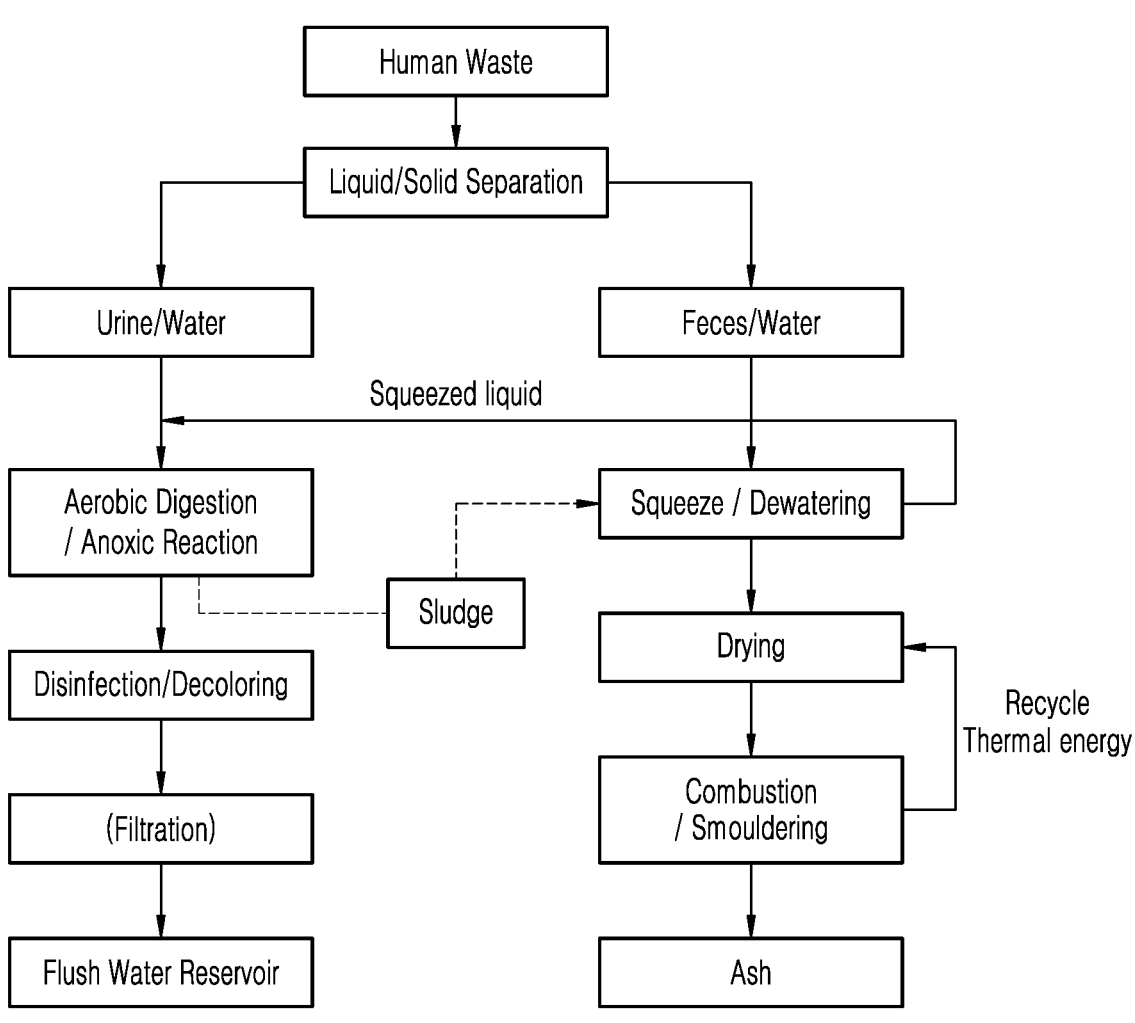
FIG. 2 is an example of a flowchart describing a toilet waste treatment process by using an example of the household toilet waste treatment system of FIG. 1.

FIG. 2 is an example of a flowchart describing a toilet waste treatment process by using an example of the household toilet waste treatment system of FIG. 1. As shown in FIG. 2, the toilet waste may be separated into liquids, i.e., urine and water, and solids, i.e., excrements including feces and water, in the solid-liquid separation toilet 100. The liquids may undergo an anoxic reaction and oxic digestion in the compartment 122 comprising the anaerobic bioreactor, the anoxic bioreactor, or a combination thereof and the oxygen tank 124, respectively, in the biological treatment apparatus 120, and then, sterilized and decolorized in the sterilization apparatus 140. Next, the sterilized waste may optionally be filtered and transported to the flush water reservoir 220. Meanwhile, the solids may be squeezed or dewatered in the dewaterer, and some liquids therefrom may be sent to the compartment 122 comprising the anaerobic bioreactor, the anoxic bioreactor, or a combination thereof 122 and the oxygen tank 124 in the biological treatment apparatus 120. The remaining solid waste may be dried and combusted in the combustion apparatus 164 to become ash or waste of which the surface or a portion has been combusted. Here, a portion of heat generated in the combustion apparatus 164 may be recovered and used to dry the obtained solid.

Figure 3:
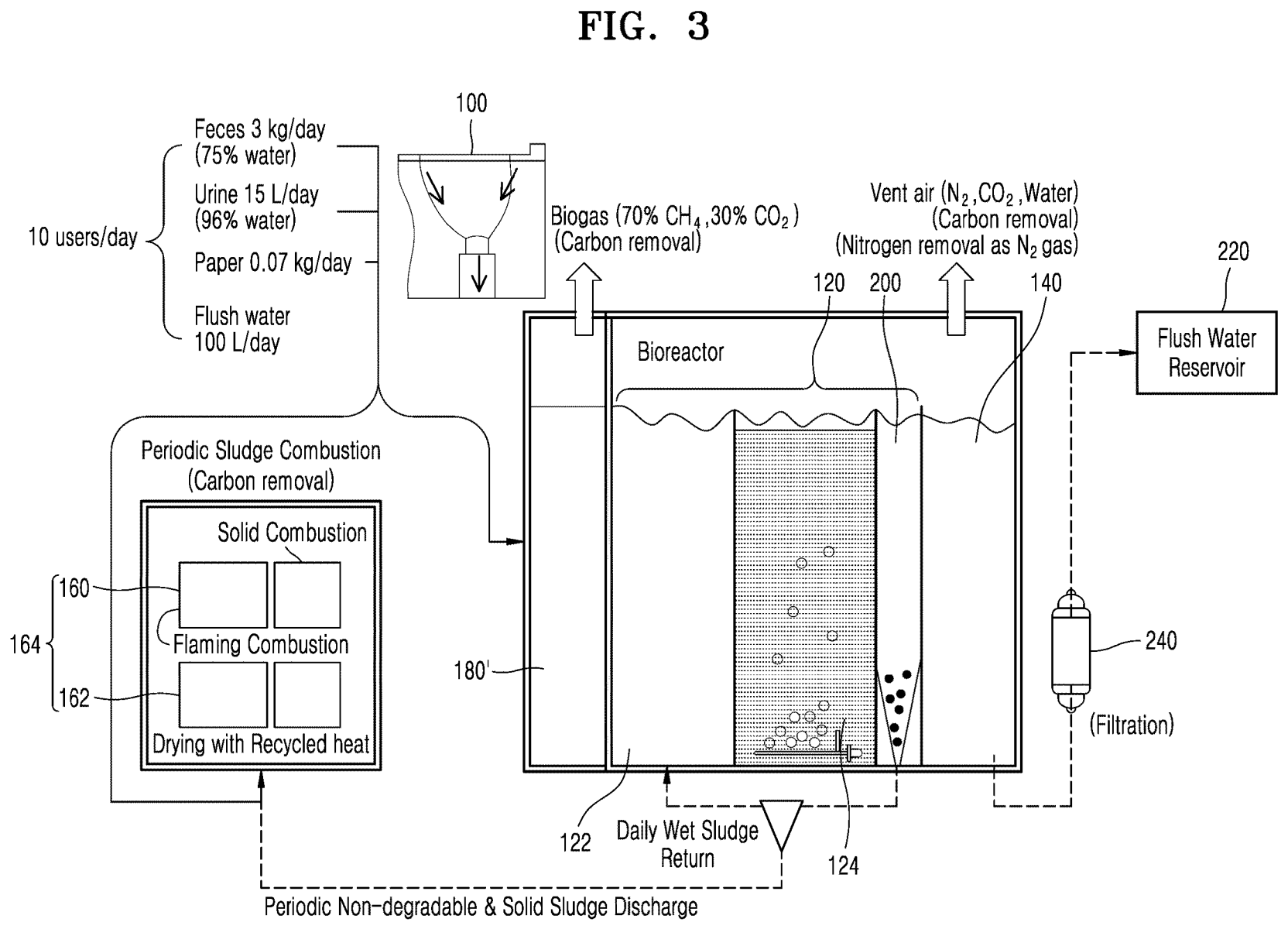

FIG. 3 is a diagram schematically showing an example of the household toilet waste treatment system comprising an anaerobic digestion bioreactor 180'. In FIG. 3, the household toilet waste treatment system comprises: the solid-liquid separation toilet 100; the anaerobic digestion bioreactor 180'; the biological treatment apparatus 120; the sterilization apparatus 140; the combustion apparatus 164; and the flush water reservoir 220. The solid-liquid separation toilet 100 may be connected to the anaerobic digestion bioreactor 180' to accommodate liquids of the toilet waste, and may be connected to the combustion apparatus 164 to accommodate solids of the toilet waste. The combustion apparatus 164 may comprise a sub-combustion device 160 and a dryer 162. The anaerobic digestion bioreactor 180' may be connected to the biological treatment apparatus 120 that does not comprise an anaerobic digestion bioreactor. The anaerobically digested waste may be transported to the biological treatment apparatus 120 that does not comprise an anaerobic digestion bioreactor. The biological treatment apparatus 120 may comprise the compartment 122 comprising an anaerobic bioreactor, an anoxic bioreactor, or a combination thereof, the oxygen tank 124, and the precipitation tank 200. The compartment 122 comprising an anaerobic bioreactor, an anoxic bioreactor, or a combination thereof may be connected to the oxygen tank 124 so that the toilet waste treated in the compartment 122 can be transported to the oxygen tank 124. The oxygen tank 124 may be connected to the precipitation tank 200 so that the toilet waste treated in the oxygen tank 124 can be transported to the precipitation tank 200. The precipitation tank 200 may be connected to the anaerobic bioreactor, the anoxic bioreactor 122, or the combustion apparatus 164 so that a part of sludge precipitated in the precipitation tank 200 can be transported to the front of the anaerobic bioreactor or the anoxic bioreactor 122 or to the combustion apparatus 164. The precipitation tank 200 may be connected to the sterilization apparatus 140 so that the liquids of the toilet waste treated in the precipitation tank 200 can be transported to the sterilization apparatus 140. The sterilization apparatus 140 may be connected to the water reservoir 220 so that the toilet waste sterilized in the sterilization apparatus 140 can be transported to the flush water reservoir 220. A filter 240 may be connected between the sterilization apparatus 140 and the flush water reservoir 220 so that the toilet waste sterilized in the sterilization apparatus 140 may be filtered and then transported to the flush water reservoir 220.

Figure 4:
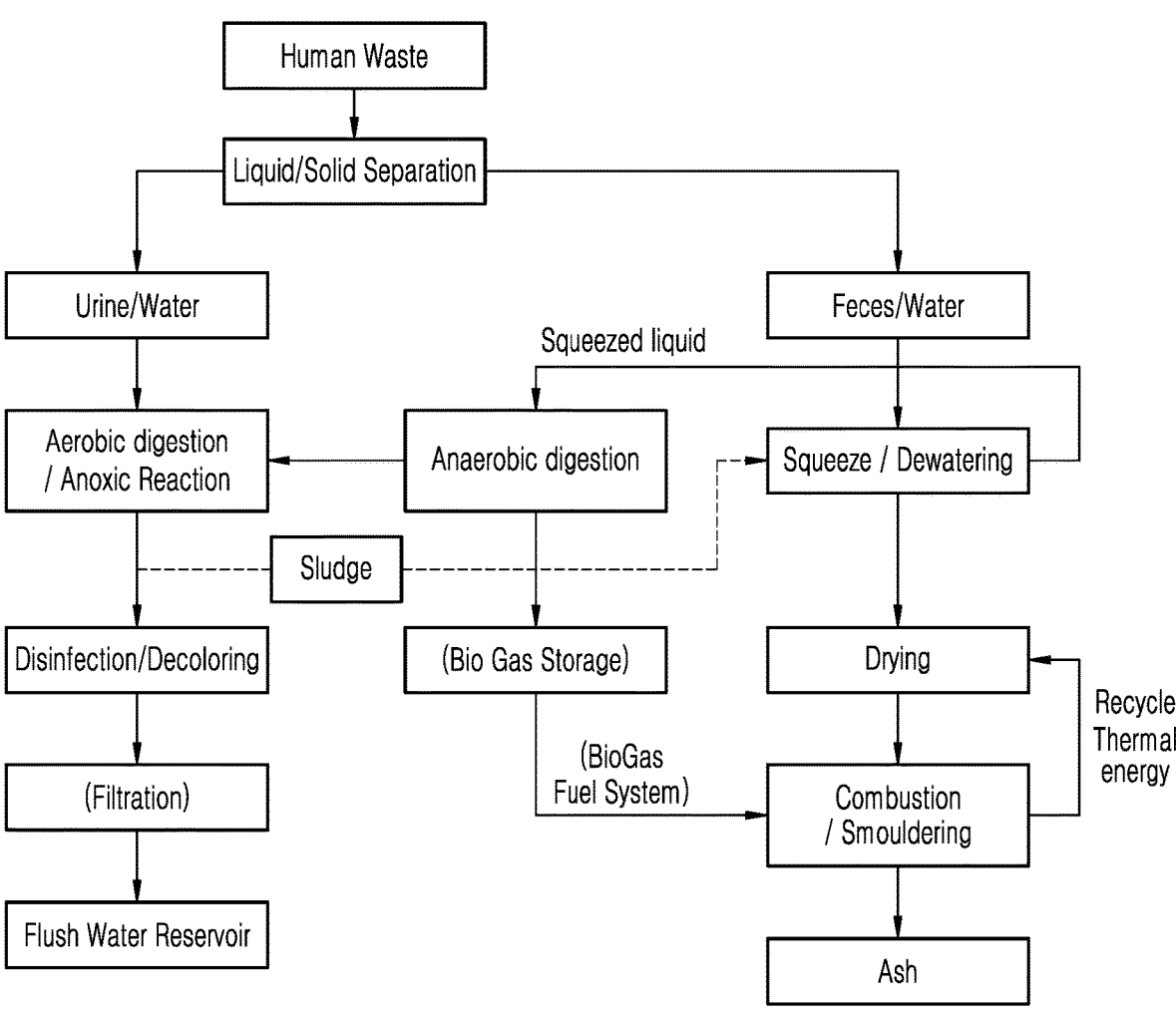
FIG. 4 is an example of a flowchart describing a toilet waste treatment process by using an example of the household toilet waste treatment system comprising the anaerobic digestion bioreactor 180' of FIG. 3.

FIG. 4 is an example of a flowchart describing a toilet waste treatment process by using an example of the household toilet waste treatment system comprising the anaerobic digestion bioreactor 180' of FIG. 3. As shown in FIG. 4, the toilet waste may be separated into liquids, i.e., urine and water, and solids, i.e., excrements including feces and water, in the solid-liquid separation toilet 100. The liquid toilet waste may be anaerobically digested and solubilized in the anaerobic digestion bioreactor 180'. The anaerobically digested waste may undergo an anoxic reaction and oxic digestion in the compartment 122 comprising the anaerobic bioreactor, the anoxic bioreactor, or a combination thereof and the oxygen tank 124, respectively, in the biological treatment apparatus 120 that does not comprise an anaerobic digestion bioreactor, and then, sterilized and decolorized in the sterilization apparatus 140. Next, the sterilized waste may optionally be filtered and transported to the flush water reservoir 220. Meanwhile, the solids may be squeezed or dewatered in the dewaterer, and some liquids therefrom may be transported to the anaerobic digestion bioreactor 180', anaerobically digested, and sent to the compartment 122 comprising the anaerobic bioreactor, the anoxic bioreactor, or a combination thereof, and to the oxygen tank 124. The remaining solid waste may be dried and combusted in the combustion apparatus 164 to become ash or waste of which the surface or a portion has been combusted. Here, a portion of heat generated in the combustion apparatus 164 may be recovered and used to dry the obtained solid.

In the household toilet waste treatment system, the elements comprising the solid-liquid separation toilet, the biological treatment apparatus, the sterilization apparatus, and the combustion apparatus may be arranged in one building. The household toilet waste treatment system may be in a configuration in which the household toilet waste treatment system is not connected to other elements outside a building through pipes, or may be in a configuration in which multiple separation toilets are connected to one another by a pipe. A household toilet may be in a configuration in which a single house living nearby through are connected to one another through a pipe or a collective house, such as a row house or an apartment, may be connected to one another through a pipe to transport the separated solid and liquid toilet wastes through a pipe. The household toilet may be used in outdoor spaces such as construction sites or campsites, if necessary. However, the household toilet waste treatment system may be distinguished from a collective treatment facility in which solid and liquid toilet wastes are mixed and transported for treatment through a long pipe of several tens of kilometers as in the existing waste water treatment facility.

Another aspect provides a household toilet waste treatment system comprising: the solid-liquid separation toilet 100 for separating toilet waste into liquid toilet waste and solid toilet waste; the biological treatment apparatus 120 for biologically treating the liquid toilet waste transported from the solid-liquid separation toilet 100; an anaerobic digestion bioreactor 180 for biologically treating the solid toilet waste transported from the solid-liquid separation toilet 100 under anaerobic conditions; the sterilization apparatus 140 for sterilizing the biotreated liquid waste transported from the biological treatment apparatus 120; and the combustion apparatus 164 for combustion of the anaerobically digested solid toilet waste transported from the anaerobic digestion bioreactor 180 and the biotreated solid waste transported from the biological treatment apparatus 120.

In the household toilet waste treatment system, the solid-liquid separation toilet may include a liquid collecting unit for accommodating the separated liquid toilet waste and a solid collecting unit for accommodating the separated solid toilet waste. The liquid collecting unit may be connected to the biological treatment apparatus. The solid collecting unit may be connected to the combustion apparatus. The liquid toilet waste collected in the liquid collecting unit may be continuously transported to the biological treatment apparatus, or may be stored in liquid toilet waste reservoir and then transported to the biological treatment apparatus. Thus, the household toilet waste treatment system may include the liquid toilet waste reservoir that is between the liquid collecting unit of the solid-liquid separation toilet and the biological treatment apparatus and connected with the liquid collecting unit of the solid-liquid separation toilet and the biological treatment apparatus. In addition, the solid toilet waste collected in the solid collecting unit may be continuously transported to the anaerobic digestion bioreactor 180, or may be stored in a solid toilet waste reservoir first and then transported to the anaerobic digestion bioreactor. Thus, the household toilet waste treatment system may include the solid toilet waste reservoir that is between the solid collecting unit of the solid-liquid separation toilet and the anaerobic digestion bioreactor and connected with the solid collecting unit of the solid-liquid separation toilet and the combustion apparatus. The anaerobic digestion bioreactor 180 may comprise a mixer 182, a vent 186, or a combination thereof.

The solid-liquid separation toilet may be configured to have a solid separation rate and a liquid separation rate suitable to provide liquid toilet waste in an amount less than or equal to an average COD amount that can be consumed in a bioreactor. For example, the solid-liquid separation toilet may be configured to have a solid separation rate and a liquid separation rate of 50% to 100%, respectively. The solid separation rate refers to a proportion of separating solid components of the introduced toilet waste into solids. The solid separation rate may be calculated as a proportion of a total content of solids separated from TSS among the introduced toilet waste. The liquid separation rate refers to a proportion of separating liquid components of the introduced toilet waste into liquids. The liquid separation rate may be calculated as a proportion of a total volume of the portion in which the total volume is separated into liquids among the introduced toilet waste. The solid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. In addition, the liquid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. For example, the solid toilet waste may be separated at a separation rate of greater than or equal to 90% and transported to the combustion apparatus, and the liquid toilet waste may be separated at a separation rate of greater than or equal to 80% and transported to the biological treatment apparatus. The TSS may be calculated as a ratio represented in percentage obtained by drying solids that fail to pass through a Watman 934-AH filter or a similar filter thereto having a level of 1 um to 2 um pore size.

In the household toilet waste treatment system, the biological treatment apparatus may be a bioreactor, which does not comprise an anaerobic digestion bioreactor, or a combination thereof. The bioreactor that does not comprise an anaerobic digestion bioreactor may include an anaerobic bioreactor, an anoxic bioreactor, an oxic bioreactor, or a combination thereof. Such a combination may include a case where at least one anoxic bioreactor is connected with at least one oxic bioreactor so that liquid toilet waste treated in a former bioreactor reaction is transported to a latter bioreactor to be continuously treated.

In addition, the biological treatment apparatus may optionally comprise an anaerobic digestion AD bioreactor. The AD bioreactor may be arranged in combination with the bioreactor, which does not comprise an anaerobic digestion bioreactor, or a combination thereof. The AD bioreactor may be arranged in the front of the bioreactor, which does not comprise an AD bioreactor, or a combination thereof, so that an the liquid toilet waste transported from the solid-liquid separation toilet may flow in and an organic matter may be solubilized by anaerobic digestion. The AD bioreactor may further comprise a precipitation tank connected thereto for precipitating the anaerobically digested liquid toilet waste transported from the AD bioreactor. The precipitation tank may be connected to the combustion apparatus to transport solid components precipitated in the liquid toilet waste to the combustion apparatus. The precipitation tank may be connected to a bioreactor, for example, a bioreactor, which does not comprise an AD bioreactor, or a combination thereof, to transport liquid components not precipitated in the liquid toilet waste to a subsequently connected bioreactor. The AD bioreactor may comprise a vent formed to discharge gas generated during the anaerobic digestion process. The gas may include $CH_4$, $CO_2$, or $N_2$ gas. When the biological treatment apparatus 120 comprises the AD bioreactor 180', the anaerobically digested waste transported from the AD bioreactor 180 for anaerobically digesting the solid waste may be transported to the bioreactor, which does not comprise an AD bioreactor, or a combination thereof.

In the household toilet waste treatment system, the sterilization apparatus may be any sterilization apparatus commonly known in the art to which the household toilet waste treatment system belongs. The sterilization apparatus may be connected to the bioreactor for use. The sterilization apparatus may be arranged with other elements of the household toilet waste treatment system in one building rather than in a separate building.

The sterilization apparatus may be an apparatus provided with a sterilization medium. The sterilization medium may include steam, heat, radiation, plasma, ozone, vaporized hydrogen peroxide, vaporized peracetic acid, at least one gaseous disinfectant, at least one liquid disinfectant, or a filtration medium. The sterilization apparatus may comprise a heater, a radiation irradiator, an electrochemical sterilization apparatus, or a filtration device. The electrochemical sterilization apparatus may comprise an electrode, and may induce electrochemical production of sterilization species by flowing a current to water through the electrode. The sterilization species may comprise species produced from water itself, such as ozone, or species produced from those dissolved in water, such as those that oxidize chlorine ions to free chlorine. The sterilization apparatus may comprise, for example, an ozone generator, an ultraviolet irradiator, an ozone generator and an ultraviolet irradiator, a heater, a plasma generator, a filtration device, an electrochemical sterilization apparatus, or a combination thereof. For example, the sterilization apparatus may comprise an ozone generator, an ultraviolet irradiator, or both an ozone generator and an ultraviolet irradiator, or an electrochemical sterilization apparatus. The household toilet waste treatment system may comprise a sterilization bioreactor containing the biologically treated liquid toilet waste transported from the biological treatment apparatus, and the sterilization apparatus may be connected to the sterilization bioreactor for sterilization treatment. In the household toilet waste treatment system, the combustion apparatus may comprise a container for containing the solid waste and a heater for applying heat to the solid toilet waste in the container. The combustion apparatus may comprise a dryer for drying the solid waste before combustion. The combustion apparatus may comprise a fuel injector for injecting fuel into the container of the combustion apparatus and an igniter for igniting the fuel injected into the container. In addition, the combustion apparatus may comprise, separately from the container of the dryer, a container for containing the dried solid waste transported from the container of the dryer.

The household toilet waste treatment system may further comprise a dewaterer for dewatering the anaerobically digested solid waste transported from the AD bioreactor to the combustion apparatus and the biotreated solid waste transported from the biological treatment apparatus. The dewaterer may comprise a squeezer, a filter, or a centrifuge. The solid waste transported from the biological treatment apparatus to the combustion apparatus may be non-biodegradable waste or biomass. The solid waste transported from the biological treatment apparatus to the combustion apparatus may be sludge or activated sludge. Accordingly, the term "solid waste" as used in the present specification may refer to solid components, and may include not only completely dried solid waste, but also solid waste containing moisture at some extent. The moisture content in the solid waste may be, for example, in a range of 0% to 99%, 0% to 90%, 0% to 70%, 0% to 50%, 0% to 40%, 5% to 40%, 10% to 40%, 15% to 40%, 20% to 40%, or 10% to 30%. The dewaterer may be arranged between the anaerobic digestion bioreactor and combustion apparatus or between the biological treatment apparatus and the combustion apparatus.

The biological treatment apparatus may comprise a precipitation tank for precipitating the biotreated waste. The precipitation tank may comprise an inlet through which the biotreated waste can be introduced from the bioreactor of the biological treatment apparatus. In addition, the precipitation tank may be connected to the bioreactor of the biological treatment apparatus to return a precipitate to the bioreactor, and/or may be connected to the combustion apparatus to transport a precipitate to the combustion apparatus. The precipitation tank, the bioreactor, and/or the combustion apparatus may comprise a regulator, for example, a pump, a valve, etc., for regulating a flow rate of water being transported.

In the household toilet waste treatment system, the biological treatment apparatus may be connected to a water reservoir so that the biotreated water can be transported to the water reservoir. The water reservoir may be a reservoir for flush water of the solid-liquid separation toilet. The biological treatment apparatus may comprise a regulator, for example, a valve, for regulating a flow rate of the water transported to the water reservoir. Accordingly, the household toilet waste treatment system may have a path for recycling water purified from toilet waste to be used as flush water.

The household toilet waste treatment system may further comprise a filter installed to filter the biotreated water transported from the biological treatment apparatus to the water reservoir. In the household toilet waste treatment system, the biological treatment apparatus may comprise a vent formed to discharge gas generated in the biological treatment process. The gas may include $CH_4$, $CO_2$, $N_2$, or a combination thereof.

In the household toilet waste treatment system, the AD bioreactor 180 may have an anaerobic condition and contain an anaerobic microorganism. The anaerobic condition may be achieved by removing oxygen by vacuum, biological respiration, or injection of an inert gas. The AD bioreactor may be connected to a vacuum supply means and an inert gas, such as $N_2$, supply means. The vacuum supply means may be a pump. The inert gas supply means may be an $N_2$ gas supplier. The anaerobic digestion bioreactor may contain an anaerobic microorganism. The anaerobic microorganism may be inoculated from the outside, or may be returned from the biological treatment apparatus 120 and provided in the form of sludge or activated sludge.

The household toilet waste treatment system may further comprise a solid-liquid separation bioreactor that is configured to separate the anaerobically digested solid toilet waste transported from the anaerobic digestion bioreactor into solid waste and liquid waste, and the anaerobic digestion bioreactor may be connected to the solid-liquid separation bioreactor so that the anaerobically digested solid toilet waste can be transported to the solid-liquid separation bioreactor. The solid-liquid separation bioreactor may be a precipitation tank. The solid-liquid separation bioreactor may be connected to the combustion apparatus so that the separated solid waste can be transported to the combustion apparatus. The anaerobic digestion bioreactor may be connected to the biological treatment apparatus so that liquid components of the anaerobically digested solid toilet waste can be transported to the biological treatment apparatus. For example, the precipitation tank of the anaerobic digestion bioreactor may be connected to the biological treatment apparatus so that liquid components of the anaerobically digested solid toilet waste can be transported to the biological treatment apparatus. The household toilet waste treatment system may further comprise a solid-liquid separation bioreactor that is configured to separate the anaerobically digested solid toilet waste transported from the anaerobic digestion bioreactor into solid waste and liquid waste, wherein the anaerobic digestion bioreactor may be connected to the solid-liquid separation bioreactor to transport the anaerobically digested solid toilet waste to the solid-liquid separation bioreactor, and the solid-liquid separation bioreactor may be connected to the biological treatment apparatus to transport liquid components of the anaerobically digested solid toilet waste to the biological treatment apparatus.

The anaerobic digestion bioreactor may include a vent formed to discharge gas generated during an anaerobic digestion process. The gas may comprise $CH_4$, $CO_2$, or a mixture thereof. The vent may be configured to be connected to the combustion apparatus, and the gas may be used as a fuel for generating heat in the combustion apparatus. The combustion apparatus may comprise a combustion device for combustion of the dried solid waste. The vent may be configured to be connected to the combustion apparatus, and the gas may be used as a fuel for generating heat in the combustion apparatus.

In an embodiment, the household toilet waste treatment system may comprise: the solid-liquid separation toilet 100 for separating toilet waste into liquid toilet waste and solid toilet waste; the biological treatment apparatus 120 for biologically treating the liquid toilet waste transported from the solid-liquid separation toilet 110; the anaerobic digestion bioreactor 180 for biologically treating the solid toilet waste transported from the solid-liquid separation toilet 110 under anaerobic conditions; the sterilization apparatus 140 for sterilizing the biotreated liquid waste transported from the biological treatment apparatus 120; and the combustion apparatus 164 for combustion of the anaerobically digested solid toilet waste transported from the anaerobic digestion bioreactor and the solid toilet waste transported from the biological treatment apparatus 120, wherein the biological treatment apparatus 120 may comprise a precipitation tank in which the biotreated waste is precipitated, and the precipitation tank may comprise an inlet for introducing the biotreated waste from a bioreactor of the biological treatment apparatus 120, and may be connected to the bioreactor so that the precipitate can be returned to the bioreactor of the biological treatment apparatus 120 and/or may be connected to the combustion apparatus 164 so that the precipitate can be transported to the combustion apparatus 164.

The sterilization apparatus may be any sterilization apparatus commonly known in the art to which the household toilet waste treatment system belongs. The sterilization apparatus may be connected to the bioreactor for use. The sterilization apparatus may be arranged with other elements of the household toilet waste treatment system in one building rather than in a separate building.

The sterilization apparatus may be an apparatus provided with a sterilization medium. The sterilization medium may include steam, heat, radiation, plasma, ozone, vaporized hydrogen peroxide, vaporized peracetic acid, at least one gaseous disinfectant, at least one liquid disinfectant, or a filtration medium. The sterilization apparatus may comprise a heater, a radiation irradiator, an electrochemical sterilization apparatus, or a filtration device. The electrochemical sterilization apparatus may comprise an electrode, and may induce electrochemical production of sterilization species by flowing a current to water through the electrode. The sterilization species may comprise species produced from water itself, such as ozone, or species produced from those dissolved in water, such as those that oxidize chlorine ions to free chlorine. The sterilization apparatus may comprise, for example, an ozone generator, an ultraviolet irradiator, an ozone generator and an ultraviolet irradiator, a heater, a plasma generator, a filtration device, an electrochemical sterilization apparatus, or a combination thereof. The sterilization apparatus may comprise a sterilization bioreactor for containing the biotreated liquid waste transported from the ozone generator, the ultraviolet irradiator, or ozone generator, and both from the ultraviolet irradiator and the biological treatment apparatus 120. The sterilization apparatus may be connected to the sterilization bioreactor to perform sterilization. In an embodiment, the combustion apparatus may comprise a container for containing the solid waste and a heater for applying heat to the solid toilet waste in the container. The combustion apparatus may comprise a combustion device for combustion of the dried solid waste. The combustion apparatus may comprise a fuel injector for injecting fuel into the container of the combustion apparatus and an igniter for igniting the fuel injected into the container. In addition, the combustion apparatus may comprise, separately from the container of the dryer, a container for containing the dried solid waste transported from the container of the dryer.

In an embodiment, the biological treatment apparatus 120 may comprise: an anoxic bioreactor (A) and an oxic bioreactor (O); an anoxic bioreactor (A), an oxic bioreactor (O), and an anoxic bioreactor (A); an anaerobic bioreactor, an anoxic bioreactor (A), and an oxic bioreactor (A); an anoxic bioreactor (A), an oxic bioreactor (O), an anoxic bioreactor (A), and an oxic bioreactor (O); an anaerobic bioreactor, an oxic bioreactor (O), an anoxic bioreactor (A), an oxic bioreactor (O), and an anoxic bioreactor (A); an MUCT bioreactor; an UCT bioreactor; a sequencing batch reactor; a partial nitrification bioreactor and an anammox bioreactor; an anammox bioreactor; or a combination thereof.

In an embodiment, the biological treatment apparatus may be connected to a water reservoir so that the biotreated water can be transported to the water reservoir. The water reservoir may be a reservoir for flush water of the solid-liquid separation toilet. Accordingly, the household toilet waste treatment system may have a path for recycling water purified from toilet waste to be used as flush water. In an embodiment, the household toilet waste treatment system may further comprise a filter installed to filter the biotreated water transported from the biological treatment apparatus to the water reservoir.

In an embodiment, the household toilet waste treatment system may further include a solid-liquid separation bioreactor that is configured to separate the anaerobically digested solid toilet waste transported from the anaerobic digestion bioreactor into solids and liquids, and the anaerobic digestion bioreactor may be connected to the solid-liquid separation bioreactor so that the anaerobically digested solid toilet waste can be transported to the solid-liquid separation bioreactor. The solid-liquid separation bioreactor may be a precipitation tank. The solid-liquid separation bioreactor may be connected to the combustion apparatus so that the separated solid waste can be transported to the combustion apparatus. The anaerobic digestion bioreactor may be connected to the biological treatment apparatus so that liquid components of the anaerobically digested solid toilet waste can be transported to the biological treatment apparatus. For example, the precipitation tank of the anaerobic digestion bioreactor may be connected to the biological treatment apparatus so that liquid components of the anaerobically digested solid toilet waste can be transported to the biological treatment apparatus. The household toilet waste treatment system may further comprise a solid-liquid separation bioreactor that is configured to separate the anaerobically digested solid toilet waste transported from the anaerobic digestion bioreactor into solid waste and liquid waste, wherein the anaerobic digestion bioreactor may be connected to the solid-liquid separation bioreactor to transport the anaerobically digested solid toilet waste to the solid-liquid separation bioreactor, and the solid-liquid separation bioreactor may be connected to the biological treatment apparatus to transport liquid components of the anaerobically digested solid toilet waste to the biological treatment apparatus.

The anaerobic digestion bioreactor may include a vent formed to discharge gas generated during an anaerobic digestion process. The gas may comprise $CH_4$, $CO_2$, or a mixture thereof. The vent may be connected to the combustion apparatus to transport the gas. The gas may be used as a fuel for generating heat in the combustion apparatus. The combustion apparatus may comprise a dryer for drying the toilet waste before combustion. The vent may be connected to the combustion apparatus to transport the gas. The gas may be used as a fuel for generating heat in the combustion apparatus.

In the household toilet waste treatment system, the elements comprising the solid-liquid separation toilet, the anaerobic digestion bioreactor, the biological treatment apparatus, the sterilization apparatus, and the combustion apparatus may be arranged in one building. The household toilet waste treatment system may be in a configuration in which the household toilet waste treatment system is not connected to other elements outside a building through pipes, or may be in a configuration in which multiple separation toilets are connected to one another by a pipe. A household toilet may be in a configuration in which a single house living nearby through are connected to one another through a pipe or a collective house, such as a row house or an apartment, may be connected to one another through a pipe to transport the separated solid and liquid toilet wastes through a pipe. However, the household toilet waste treatment system may be distinguished from the existing waste water treatment facility in which solid and liquid toilet wastes are mixed and transported through a long pipe of several tens of kilometers.

Figure 5:
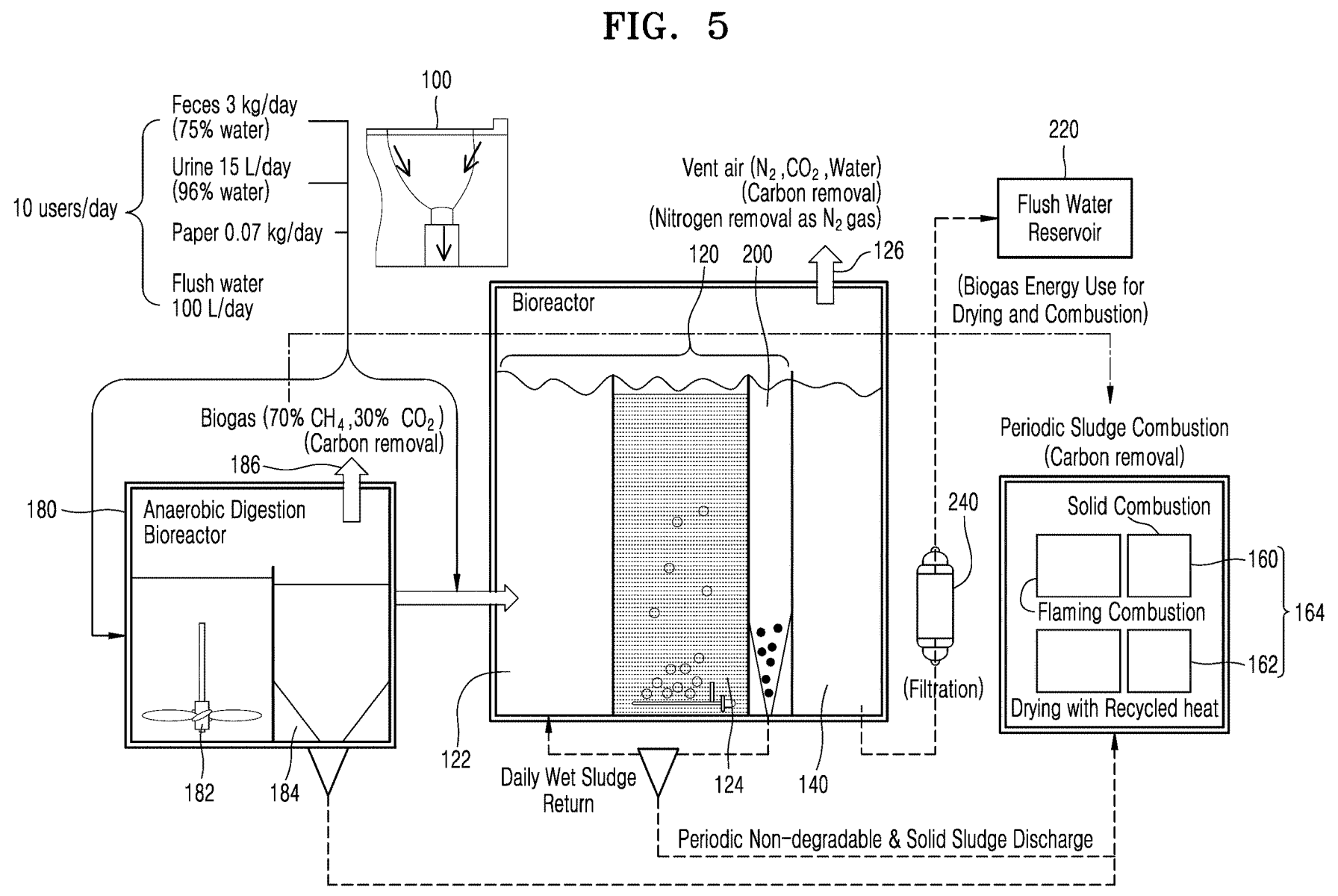

FIG. 5 is a diagram schematically showing an example of the household toilet waste treatment system comprising the anaerobic digestion bioreactor. In FIG. 5, the household toilet waste treatment system comprises: the solid-liquid separation toilet 100; the anaerobic digestion bioreactor 180; the biological treatment apparatus 120; the sterilization apparatus 140; the combustion apparatus 164; and the flush water reservoir 220. The solid-liquid separation toilet 100 may be connected to the biological treatment apparatus 120 to accommodate liquids of the toilet waste, and may be connected to the anaerobic digestion bioreactor 180 to accommodate solids of the toilet waste. The biological treatment apparatus 120 may comprise the compartment 122 comprising an anaerobic bioreactor, an anoxic bioreactor, or a combination thereof, the oxygen tank 124, and the precipitation tank 200. The compartment 122 comprising an anaerobic bioreactor, an anoxic bioreactor, or a combination thereof may be connected to the oxygen tank 124 so that the toilet waste treated in the compartment 122 can be transported to the oxygen tank 124. The oxygen tank 124 may be connected to the precipitation tank 200 so that the toilet waste treated in the oxygen tank 124 can be transport to the precipitation tank 200. The precipitation tank 200 may be connected to the anaerobic bioreactor, the anoxic bioreactor 122, or the combustion apparatus 164 so that a part of sludge precipitated in the precipitation tank 200 can be transported to the front of the anaerobic bioreactor or the anoxic bioreactor 122 or to the combustion apparatus 164. The precipitation tank 200 may be connected to the sterilization apparatus 140 so that the liquids of the toilet waste treated in the precipitation tank 200 can be transported to the sterilization apparatus 140. The sterilization apparatus 140 may be connected to the water reservoir 220 so that the toilet waste sterilized in the sterilization apparatus 140 can be transported to the flush water reservoir 220. A filter 240 may be connected between the sterilization apparatus 140 and the flush water reservoir 220 so that the toilet waste sterilized in the sterilization apparatus 140 may be filtered and then transported to the flush water reservoir 220.

The anaerobic digestion bioreactor 180 may optionally further comprise, in addition to the anaerobic digestion bioreactor 182, a solid-liquid separation bioreactor 184. The anaerobic digestion bioreactor 180 may comprise a vent 186 for discharging biogas generated in the anaerobic digestion process. The vent 186 may be connected to the combustion apparatus 164, and the biogas may be transported to the combustion apparatus 164 to be used as a fuel for the combustion apparatus.

Figure 6:
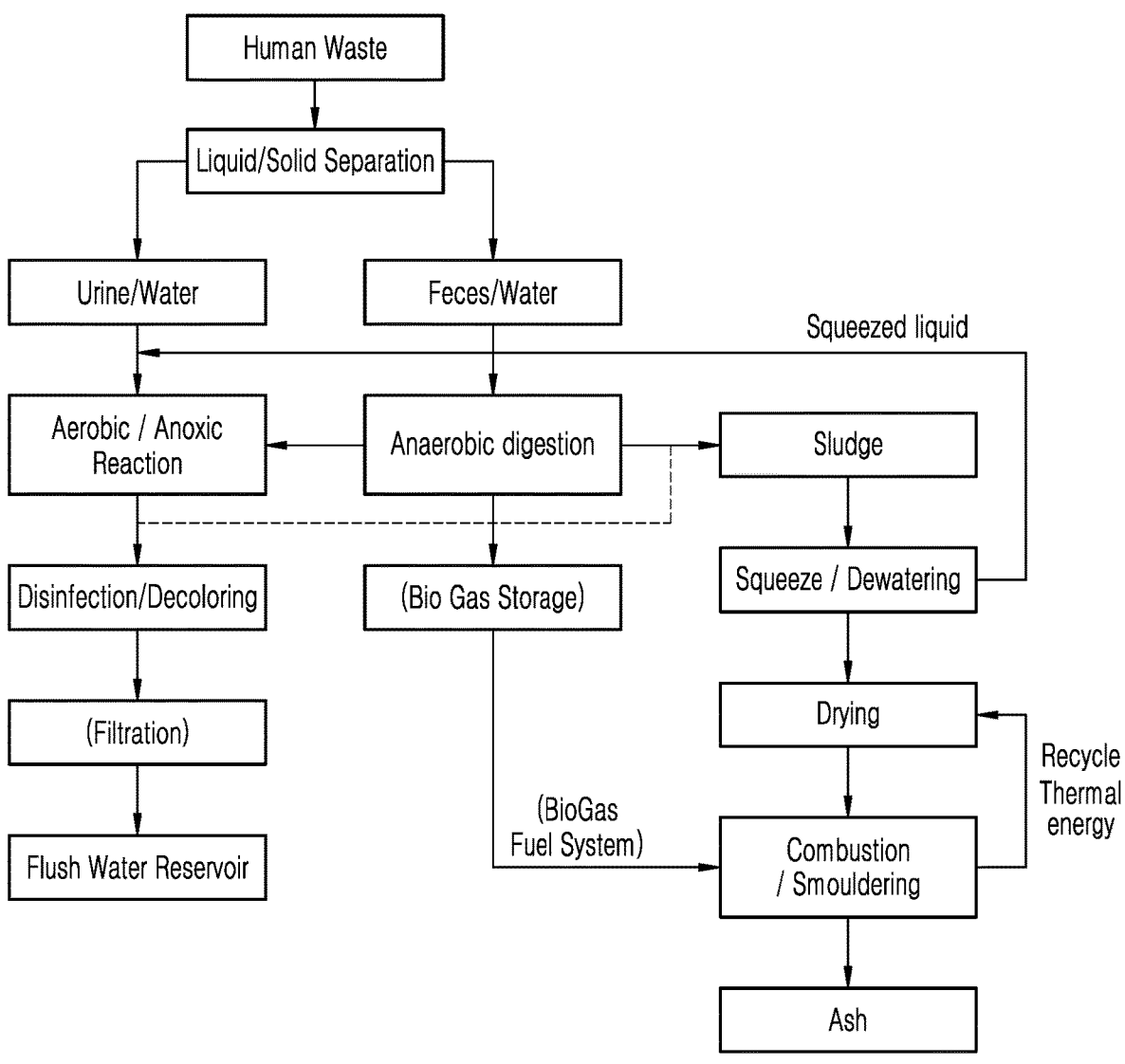
FIG. 6 is an example of a flowchart describing a toilet waste treatment process by using an example of the household toilet waste treatment system of FIG. 5.

FIG. 6 is an example of a flowchart describing a toilet waste treatment process by using an example of the household toilet waste treatment system of FIG. 5. As shown in FIG. 6, the toilet waste may be separated into liquids, i.e., urine and water, and solids, i.e., excrements including feces and water, in the solid-liquid separation toilet 100. The liquids may undergo an anoxic reaction and oxic digestion in the compartment 122 comprising the anaerobic bioreactor, the anoxic bioreactor, or a combination thereof and the oxygen tank 124, respectively, in the biological treatment apparatus 120, and then, sterilized and decolorized in the sterilization apparatus 140. Next, the sterilized waste may optionally be filtered and transported to the flush water reservoir 220. Meanwhile, the solids may be anaerobically digested, and some liquids therefrom may be sent to the compartment 182 comprising the anaerobic bioreactor, the anoxic bioreactor, or a combination thereof, and to the oxygen tank 124, in the biological treatment apparatus 120. The remaining solids, for example, sludge, may optionally be squeezed or dewatered and then dried and combusted in the combustion apparatus 164. Here, a portion of heat generated in the combustion apparatus 164 may be used to dry the dewatered and recovered solid. In addition, the biogas generated during the anaerobic digestion process in the anaerobic digestion bioreactor 180 may be sent to the combustion apparatus 164 to be used as a fuel. In addition, after the anaerobic digestion in the anaerobic digestion bioreactor 180, some liquid components may be sent to the sterilization apparatus 140 to be sterilized or decolorized. In addition, liquids produced in the process of squeezing or dewatering the solids, for example, sludge, produced in the anaerobic digestion bioreactor 180 may be sent to the compartment 122, which comprises the anaerobic bioreactor, the anoxic bioreactor, or a combination thereof, and to the oxygen tank 124, in the biological treatment apparatus 120.

Another aspect provides a method of treating toilet waste, the method comprising: separating toilet waste into liquid toilet waste and solid toilet waste by throwing toilet waste into a solid-liquid separation toilet; transporting the separated solid toilet waste to a combustion apparatus for combustion and transporting the separated liquid toilet waste to a biological treatment apparatus for biotreatment; transporting the biotreated liquid waste to a sterilization apparatus for sterilization; transporting a part of sludge of the biotreated liquid waste to the combustion apparatus and transporting a part of the sludge to an anoxic bioreactor of the biological treatment apparatus to be supplemented with a microorganism.

The separating of the toilet waste into liquid toilet waste and solid toilet waste may be configured to have a solid separation rate and a liquid separation rate to provide the liquid toilet waste in an amount less than or equal to an average COD amount that can be consumed in a bioreactor. For example, the separating of the toilet waste into solid toilet waste and liquid toilet waste may be configured to have a solid separation rate and a liquid separation rate of 50% to about 100%, respectively. The solid separation rate refers to a proportion of separating solid components of the introduced toilet waste into solids. The solid separation rate may be calculated as a proportion of a total content of solids separated from TSS among the introduced toilet waste. The liquid separation rate refers to a proportion of separating liquid components of the introduced toilet waste into liquids. The liquid separation rate may be calculated as a proportion of a total volume of the portion in which the total volume is separated into liquids among the introduced toilet waste. The solid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. In addition, the liquid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. For example, the solid toilet waste may be separated at a separation rate of greater than or equal to 90% and transported to the combustion apparatus, and the liquid toilet waste may be separated at a separation rate of greater than or equal to 80% and transported to the biological treatment apparatus. The separation may be performed at the same time as defecation and urination. The separation may be performed immediately after defecation and urination without storing feces and urine. The solid-liquid separation toilet may comprise a solid collecting unit and a liquid collecting unit. The TSS may be calculated as a ratio represented in percentage obtained by drying solids that fail to pass through a Watman 934-AH filter or a similar filter thereto having a level of 1 um to 2 um pore size.

The transporting of the separated solid toilet waste to the combustion apparatus for drying and transporting of the separated liquid toilet waste to the biological treatment apparatus for biotreatment may further comprise dewatering the separated solid toilet waste before being transported to the combustion apparatus. The separated solid toilet waste may have a moisture content in a range of 70% to 99%, 80% to 99%, or 90% to 99%. The dewatering may be performed by an apparatus selected from the group consisting of a squeezer, a centrifuge, and a filter. The transporting of the separated solid toilet waste to the combustion apparatus for drying may comprise combusting the dried separated solid waste. The combustion may be performed in the combustion apparatus. The combustion apparatus may be integrated with the dryer.

The combustion apparatus, may comprise, for example, a fuel injector and an igniter in a container in which the dried separated solid waste is contained in the combustion apparatus. In addition, the dryer may exist separately from the combustion apparatus.

In the method, the biological treatment apparatus 120 may comprise: an anoxic bioreactor (A) and an oxic bioreactor (O); an anoxic bioreactor (A), an oxic bioreactor (O), and an anoxic bioreactor (A); an anaerobic bioreactor, an anoxic bioreactor (A), and an oxic bioreactor (A); an anoxic bioreactor (A), an oxic bioreactor (O), an anoxic bioreactor (A), and an oxic bioreactor (O); an anaerobic bioreactor, an oxic bioreactor (O), an anoxic bioreactor (A), an oxic bioreactor (O), and an anoxic bioreactor (A); an MUCT bioreactor; an UCT bioreactor; a sequencing batch reactor; a partial nitrification bioreactor and an anammox bioreactor; an anammox bioreactor; or a combination thereof.

The biological treatment apparatus may comprise, at the terminal part, a precipitation tank. The biological treatment apparatus may be connected in a way that liquids can be returned from the oxic bioreactor to the anoxic bioreactor in the front of the oxic bioreactor. The oxic bioreactor may be arranged alone or at the end of several oxic bioreactors. The anoxic bioreactor may be arranged alone or at the front of several anoxic bioreactors. The biological treatment apparatus may comprise an internal circulation pump for internal return. The oxic bioreactor may comprise an oxygen supplier. In the anoxic bioreactor, nitrate nitrogen that has undergone nitrification in the oxic bioreactor may be converted into nitrogen by a denitrification reaction. The DO concentration in the anoxic bioreactor may be about 0 mg/L or in a range of about 0 mg/L to about 0.2 mg/L, about 0 mg/L to about 0.15 mg/L, about 0 mg/L to about 0.1 mg/L, about 0 mg/L to about 0.05 mg/L, about 0 mg/L to about 0.01 mg/L, or about 0 mg/L to about 0.005 mg/L. The anoxic bioreactor may comprise a stirrer instead of the oxygen supplier. In the oxic bioreactor, phosphorus released from the anaerobic bioreactor may be removed by causing microorganisms to consume excessively, and ammonia nitrogen in the waste may be oxidized to nitrate nitrogen by nitrification. In addition, organic matters not removed in the anaerobic digestion bioreactor and the anoxic bioreactor may be also removed in the oxic bioreactor. The DO concentration in the oxic bioreactor may be in a range of 2.0 mg/L to 3.0 mg/L, 2.0 mg/L to 2.5 mg/L, or 2.5 mg/L to 3.0 mg/L. In the anaerobic digestion bioreactor, the organic matters may be decomposed to produce organic acids that are then subjected to anaerobic digestion. Here, the microorganisms may secrete phosphorus. The anaerobic digestion bioreactor may comprise a stirrer for mixing. The anaerobic digestion bioreactor may not comprise an oxygen supplier, for example, an air supplier. The DO concentration in the anaerobic digestion bioreactor may be about 0 mg/L or in a range of about 0 mg/L to about 0.005 mg/L.

The sterilizing may be performed by a sterilization apparatus. The sterilization apparatus may be any sterilization apparatus commonly known in the art to which the household toilet waste treatment system belongs. The sterilization apparatus may be connected to the bioreactor for use. The sterilization apparatus may be arranged with other elements of the household toilet waste treatment system in one building rather than in a separate building.

The sterilization apparatus may be an apparatus provided with a sterilization medium. The sterilization medium may include steam, heat, radiation, plasma, ozone, vaporized hydrogen peroxide, vaporized peracetic acid, at least one gaseous disinfectant, at least one liquid disinfectant, or a filtration medium. The sterilization apparatus may comprise a heater, a radiation irradiator, an electrochemical sterilization apparatus, or a filtration device. The electrochemical sterilization apparatus may comprise an electrode, and may induce electrochemical production of sterilization species by flowing a current to water through the electrode. The sterilization species may comprise species produced from water itself, such as ozone, or species produced from those dissolved in water, such as those that oxidize chlorine ions to free chlorine. The sterilization apparatus may comprise, for example, an ozone generator, an ultraviolet irradiator, an ozone generator and an ultraviolet irradiator, a heater, a plasma generator, a filtration device, an electrochemical sterilization apparatus, or a combination thereof. For example, the sterilization may be performed by an ultraviolet irradiator, an ozone generator, or both an ultraviolet irradiator and an ozone generator. The sterilization may be achieved by contacting the biotreated liquid waste with liquid containing ozone. The contacting may be achieved by flowing the biotreated liquid waste and liquid containing ozone in a counter current.

The method may include transporting the liquid sterilized in the sterilizing step to a flush water reservoir. Here, the liquid may be water. The method may further comprise filtering the sterilized liquid before transporting to the flush water reservoir.

The method may comprise transporting a part of sludge of the biotreated liquid waste to the combustion apparatus for drying and transporting a part of the sludge waste to the anoxic bioreactor of the biological treatment apparatus to be supplemented with a microorganism.

Here, the sludge may be a precipitate in the precipitation tank. The ratio of the sludge transported to the anoxic bioreactor may be adjusted within a range of 0% to 100% to maintain the concentration of mixed liquor suspended solids (MLSS) in the oxic bioreactor. In general, the ratio may be in a range of 20% to 60%. The ratio of the sludge transported to the combustion apparatus may refer to the amount of sludge remaining after being returned to the anoxic bioreactor, and may be adjusted within a range of 0% to 100%. In general, the ratio may be in a range of 40% to 80%.

The method may refer to a method of treating toilet waste, comprising throwing toilet waste into a solid-liquid separation toilet of a household toilet waste treatment system, wherein the household toilet waste treatment system may comprise: the solid-liquid separation toilet 100 for separating toilet waste into liquid toilet waste and solid toilet waste; the biological treatment apparatus 120 for biologically treating the liquid toilet waste transported from the solid-liquid separation toilet; the sterilization apparatus 140 for sterilizing the biotreated liquid waste transported from the biological treatment apparatus; and the combustion apparatus 164 for drying the solid toilet waste transported from the solid-liquid separation toilet and the biotreated solid waste transported from the biological treatment apparatus. In the treatment of the toilet waste, the household toilet waste treatment system is the same as described above.

Another aspect provides a method of treating toilet waste, the method comprising: separating toilet waste into liquid toilet waste and solid toilet waste by throwing toilet waste into a solid-liquid separation toilet; transporting the separated solid toilet waste to an anaerobic digestion bioreactor for anaerobic digestion; transporting the liquid toilet waste separated at the step of separation and the liquid waste solubilized at the step of anaerobic digestion to a biological treatment apparatus for biotreatment; transporting the biotreated liquid waste to a sterilization apparatus for sterilization; transporting a part of sludge of the liquid waste biotreated at the step of biotreatment to the combustion apparatus for combustion and transporting a part of the sludge to an anoxic bioreactor of the biological treatment apparatus to be supplemented with a microorganism; and transporting sludge obtained at the step of anaerobic digestion to the combustion apparatus for combustion.

The separating of the toilet waste into liquid toilet waste and solid toilet waste may be configured to have a solid separation rate and a liquid separation rate suitable to provide the liquid toilet waste in an amount less than or equal to an average COD amount that can be consumed in the bioreactor. For example, the separating of the toilet waste into solid toilet waste and liquid toilet waste may be configured to have a solid separation rate and a liquid separation rate of 50% to 100%, respectively. The solid separation rate refers to a proportion of separating solid components of the introduced toilet waste into solids. The solid separation rate may be calculated as a proportion of a total content of solids separated from TSS among the introduced toilet waste. The liquid separation rate refers to a proportion of separating liquid components of the introduced toilet waste into liquids. The liquid separation rate may be calculated as a proportion of a total volume of the portion in which the total volume is separated into liquids among the introduced toilet waste. The solid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. In addition, the liquid separation rate may be, for example, in a range of 60% to 100%, 70% to 100%, 80% to 100%, 90% to 100%, 95% to 100%, 97.5% to 100%, 60% to 95%, 70% to 90%, 80% to 95%, 90% to 95%, 95% to 97.5%, or 70% to 95%. For example, the solid toilet waste may be separated at a separation rate of greater than or equal to 90% and transported to the combustion apparatus, and the liquid toilet waste may be separated at a separation rate of greater than or equal to 80% and transported to the biological treatment apparatus. The separation may be performed at the same time as defecation and urination. The separation may be performed immediately after defecation and urination without storing feces and urine. The solid-liquid separation toilet may comprise a solid collecting unit and a liquid collecting unit.

The method includes transferring the separated solid to an anaerobic digestion tank for anaerobic digestion. In the anaerobic digestion bioreactor, the organic matters may be decomposed to produce organic acids that are then subjected to anaerobic digestion. Here, the microorganisms may secrete phosphorus. The anaerobic digestion bioreactor may comprise a stirrer for mixing. The anaerobic digestion bioreactor may not comprise an oxygen supplier, for example, an air supplier. The DO concentration in the anaerobic digestion bioreactor may be about 0 mg/L or in a range of about 0 mg/L to about 0.005 mg/L.

The method may comprise the transporting of the liquid toilet waste, which is separated at the step of separation, and the liquid waste, which is solubilized at the step of anaerobic digestion, to the biological treatment apparatus for biotreatment.

In the biotreating, the biological treatment apparatus may be a bioreactor, which does not include an anaerobic digestion bioreactor, or a combination thereof. The bioreactor that does not include an anaerobic digestion bioreactor may include an anaerobic bioreactor, an anoxic bioreactor, an oxic bioreactor, or a combination thereof. Such a combination may include a case where at least one anoxic bioreactor is connected with at least one oxic bioreactor so that liquid toilet waste treated in a former bioreactor reaction is transported to a latter bioreactor to be continuously treated.

In addition, the biological treatment apparatus may optionally comprise an anaerobic digestion (AD) bioreactor. The AD bioreactor may be arranged in combination with the bioreactor, which does not include an AD bioreactor, or a combination thereof. The AD bioreactor may be arranged in the front of the bioreactor, which does not comprise an AD bioreactor, or a combination thereof, so that an the liquid toilet waste transported from the solid-liquid separation toilet may flow in and an organic matter may be solubilized by anaerobic digestion. The AD bioreactor may further comprise a precipitation tank connected thereto for precipitating the anaerobically digested liquid toilet waste transported from the AD bioreactor. The precipitation tank may be connected to the combustion apparatus to transport solid components precipitated in the liquid toilet waste to the combustion apparatus. The precipitation tank may be connected to a bioreactor, for example, a bioreactor, which does not comprise an AD bioreactor, or a combination thereof, to transport liquid components not precipitated in the liquid toilet waste to a subsequently connected bioreactor. The AD bioreactor may comprise a vent formed to discharge gas generated during the anaerobic digestion process. The gas may include $CH_4$, $CO_2$, or $N_2$ gas. When the biological treatment apparatus 120 comprises the anaerobic digestion bioreactor 180', the anaerobically digested waste transported from the anaerobic digestion bioreactor 180 in which the solid waste undergoes anaerobic digestion may be transported to the bioreactor, which does not comprise an anaerobic digestion bioreactor, or a combination thereof.

The biological treatment apparatus may comprise, at the terminal part, a precipitation tank. The biological treatment apparatus may be connected in a way that liquids can be returned from the oxic bioreactor to the anoxic bioreactor in the front of the oxic bioreactor. The oxic bioreactor may be arranged alone or at the end of several oxic bioreactors. The anoxic bioreactor may be arranged alone or at the front of several anoxic bioreactors. The biological treatment apparatus may comprise an internal circulation pump for internal return. The oxic bioreactor may comprise an oxygen supplier. In the anoxic bioreactor, nitrate nitrogen that has undergone nitrification in the oxic bioreactor may be converted into nitrogen by a denitrification reaction. The DO concentration in the anoxic bioreactor may be about 0 mg/L or in a range of about 0 mg/L to about 0.2 mg/L, about 0 mg/L to about 0.15 mg/L, about 0 mg/L to about 0.1 mg/L, about 0 mg/L to about 0.05 mg/L, about 0 mg/L to about 0.01 mg/L, or about 0 mg/L to about 0.005 mg/L. The anoxic bioreactor may comprise a stirrer instead of the oxygen supplier. In the oxic bioreactor, phosphorus released from the anaerobic bioreactor may be removed by causing microorganisms to consume excessively, and ammonia nitrogen in the waste may be oxidized to nitrate nitrogen by nitrification. In addition, organic matters not removed in the anaerobic digestion bioreactor and the anoxic bioreactor may be also removed in the oxic bioreactor. The DO concentration in the oxic bioreactor may be in a range of 0.2 mg/L to 7.0 mg/L, 1.0 mg/L to 7.0 mg/L, 1.0 mg/L to 5.0 mg/L, 1.0 mg/L to 4.0 mg/L, or 1.0 mg/L to 3.0 mg/L. In the anaerobic digestion bioreactor, the organic matters may be decomposed to produce organic acids that are then subjected to anaerobic digestion. Here, the microorganisms may secrete phosphorus. The anaerobic digestion bioreactor may comprise a stirrer for mixing. The anaerobic digestion bioreactor may not comprise an oxygen supplier, for example, an air supplier. The DO concentration in the anaerobic digestion bioreactor may be about 0 mg/L or in a range of about 0 mg/L to about 0.005 mg/L.

The ratio of the liquid waste solubilized at the step of anaerobic digestion and transported to the biological treatment apparatus may be in a range of 10% to 100%.

The step of sterilization may comprise transporting the liquid sterilized by using an ultraviolet irradiator, an ozone generator, or both an ultraviolet irradiator and an ozone generator to a flush water reservoir. Here, the liquid may be water. The method may further comprise filtering the sterilized liquid before transporting to the flush water reservoir.

The method may comprise: in the biotreatment, transporting a part of sludge in the biotreated liquid waste to the combustion apparatus for combustion and transporting a part of the sludge to anoxic bioreactor of the biological treatment apparatus to be supplemented with a microorganism; and transporting sludge obtained at the step of anaerobic digestion to the combustion apparatus for combustion.

In the above steps, the method may further comprise, before transporting to the combustion apparatus, dewatering a part of sludge of the biotreated liquid waste and sludge obtained at the step of anaerobic digestion. The dewatered sludge may have a moisture content in a range of 60% to 90%. The dewatering may be performed by an apparatus selected from the group consisting of a squeezer, a centrifuge, and a filter. In the above steps, the method may comprise combusting the dried separated solid waste. The dried sludge may have a moisture content in a range of 0% to 40%. The combustion may be performed in the combustion apparatus. The combustion apparatus may be integrated with the dryer. The combustion apparatus, may comprise, for example, a fuel injector and an igniter in a container in which the dried separated solid waste is contained in the combustion apparatus. In addition, the dryer may exist separately from the combustion apparatus.

Here, the sludge may be a precipitate in the precipitation tank. The ratio of the sludge transported to the anoxic bioreactor may be adjusted within a range of 0% to 100% to maintain the concentration of MLSS in the oxic bioreactor. In general, the ratio may be in a range of 20% to 60%. The ratio of the sludge transported to the combustion apparatus may refer to the amount of sludge remaining after being returned to the anoxic bioreactor, and may be adjusted within a range of 0% to 100%. In general, the ratio may be in a range of 40% to 80%.

The anoxic bioreactor may be arranged alone or at the front of several anoxic bioreactors. The biological treatment apparatus may comprise an internal circulation pump for internal return. The oxic bioreactor may comprise an oxygen supplier. In the anoxic bioreactor, nitrate nitrogen that has undergone nitrification in the oxic bioreactor may be converted into nitrogen by a denitrification reaction. The DO concentration in the anoxic bioreactor may be about 0 mg/L or in a range of about 0 mg/L to about 0.2 mg/L, about 0 mg/L to about 0.15 mg/L, about 0 mg/L to about 0.1 mg/L, about 0 mg/L to about 0.05 mg/L, about 0 mg/L to about 0.01 mg/L, or about 0 mg/L to about 0.005 mg/L. The anoxic bioreactor may comprise a stirrer instead of the oxygen supplier. In the oxic bioreactor, phosphorus released from the anaerobic bioreactor may be removed by causing microorganisms to consume excessively, and ammonia nitrogen in the waste may be oxidized to nitrate nitrogen by nitrification. In addition, organic matters not removed in the anaerobic digestion bioreactor and the anoxic bioreactor may be also removed in the oxic bioreactor. The DO concentration in the oxic bioreactor may be in a range of 0.2 mg/L to 7.0 mg/L, 1.0 mg/L to 7.0 mg/L, 1.0 mg/L to 5.0 mg/L, 1.0 mg/L to 4.0 mg/L, or 1.0 mg/L to 3.0 mg/L. In the anaerobic digestion bioreactor, the organic matters may be decomposed to produce organic acids that are then subjected to anaerobic digestion. Here, the microorganisms may secrete phosphorus. The anaerobic digestion bioreactor may comprise a stirrer for mixing. The anaerobic digestion bioreactor may not comprise an oxygen supplier, for example, an air supplier. The DO concentration in the anaerobic digestion bioreactor may be about 0 mg/L or in a range of about 0 mg/L to about 0.005 mg/L.

Hereinafter, the present disclosure will be described in detail with reference to Examples below. However, these Examples are provided for illustrative purposes only, and the scope of the present disclosure is not limited thereto.

Example 1: Oxic Bioreactor-Containing Biological Treatment Apparatus and Toilet Waste Treatment Using the Same In this example, several bioreactors each including an oxic bioreactor were prepared and used to treat toilet waste. For use as the toilet waste, simulant feces and urine with flush water and no paper reported by the Swiss Federal Institute of Aquatic Science and Technology (EAWAG) were used. Afterwards, actual feces and urine were used for re-verification.

As the bioreactors, the following four bioreactors were prepared: AO, AOA, AD-AO, and AD-mAO.

Here, A represents an anoxic bioreactor, O represents an oxic bioreactor, AD represents an anaerobic digestion bioreactor, and mAO represents that a unit in which an anoxic bioreactor and an oxic bioreactor are connected is repeated an integer m times. In this example, mAO in which m is 4 was used. AO represents that an anoxic bioreactor and an oxic bioreactor are arranged sequentially and connected to each other to transport liquid waste treated in the anoxic bioreactor to the oxic bioreactor. AOA represents that AO is connected to an additional an anoxic bioreactor to transport liquid waste treated in the oxic bioreactor of the AO to the additional anoxic bioreactor. The oxic bioreactor may comprise an oxygen supplier for supplying oxygen. The oxygen supplier may be a sparger or an air supplier. The AD bioreactor and the anoxic bioreactor may each comprise a stirrer. The AD-AO represents that an AD bioreactor is connected to AO, wherein, in the AO, the anoxic bioreactor may be connected to the oxic bioreactor to internally return liquid waste treated in the oxic bioreactor to the anoxic bioreactor. The AD-AO is simple and may be possibly miniaturized. The AD-mAO represents that 4-column subsequent anaerobic and oxic bioreactors are connected to the anaerobic digestion bioreactor AD, wherein the AO bioreactors are repeatedly applied to save energy and increase a processing rate. Undegraded solids in the AD bioreactor were periodically removed by precipitation. Thus, the AD bioreactor may be connected to a precipitation tank.

10 servings of simulant feces and urine were treated in each bioreactor. The simulant feces and urine were prepared by the method described in R. Penn et al., Water Research 132 (2018) 222-240, and the simulant urine was prepared according to the method of Colon et al. 2015 as described in the corresponding paper.

One serving of the simulant feces and urine includes 3 kg of feces/day, 15 L of urine/day, and 100 L of flush water/day. The feces contained 75% water and the urine contained 96% water. Table 1 shows components of the stimulant faces and urine.

TABLE 1

| | Unit | Feces | Urine |
|---|---|---|---|
| Amount | /person/day | 300 g (wet, about 75% moisture) | 1.5 L |
| COD | mg/L | 334,087 | 783 |
| | g/person/day | 100.2 | 9.0 |
| TN | mg/L | 5,000 | 948 |
| | g/person/day | 1.5 | 9.8 |
| TP | mg/L | 975 | 91 |
| | g/person/day | 0.3 | 1.1 |

First, regarding the AO bioreactors and the AOA bioreactors, simulant feces and urine for 10 servings per day were thrown into the anoxic bioreactor (A) without liquid/solid separation, and then an anoxic reaction and an oxic reaction proceeded consecutively. As a result, the water quality for the effluent released from the final bioreaction of the AO and the AOA, that is, the oxic bioreactor and the anoxic bioreactor, respectively was evaluated. The toilet waste treatment criteria according to ISO 30500 are as shown in Table 2 below (Doulaye Kone, World Toilet Summit, Expo.Sao Paolo, Brazil, Nov. 18-19, 2019).

TABLE 2

| Quality of effluent | Category A | Category B |
|---|---|---|
| COD (mg/l) | ≤50 | ≤150 |
| TSS (mg/l) | ≤10 | ≤30 |
| Total nitrogen (TN) | ≥70% reduction | |
| Total phosphorus (TP) | ≥80% reduction | |
| pH | 6 to 9 | |

In Table 2, Category A shows thresholds for unrestricted urban uses. Category B shows thresholds for surface water discharge or other restricted urban uses. As a result, COD and turbidity were found to be high in the AO bioreactors and the AOA bioreactors when simulant feces and urine were thrown thereinto and treated. Meanwhile, regarding the AD-AO bioreactors and the AD-mAO bioreactors, simulant feces and urine for 10 servings per day, in which liquid and solid were separated, were thrown into the anaerobic digestion bioreactor (AD), and then, only the liquid solubilized in the anaerobic digestion bioreactor (AD) was allowed to flow into the anoxic bioreactor (A) and the oxic bioreactor (O). As a result, the water quality of the effluent released from the last bioreaction of the AD-AO bioreactors and the AD-mAO bioreactors, that is, the oxic bioreactor, was evaluated.

Figure 7:
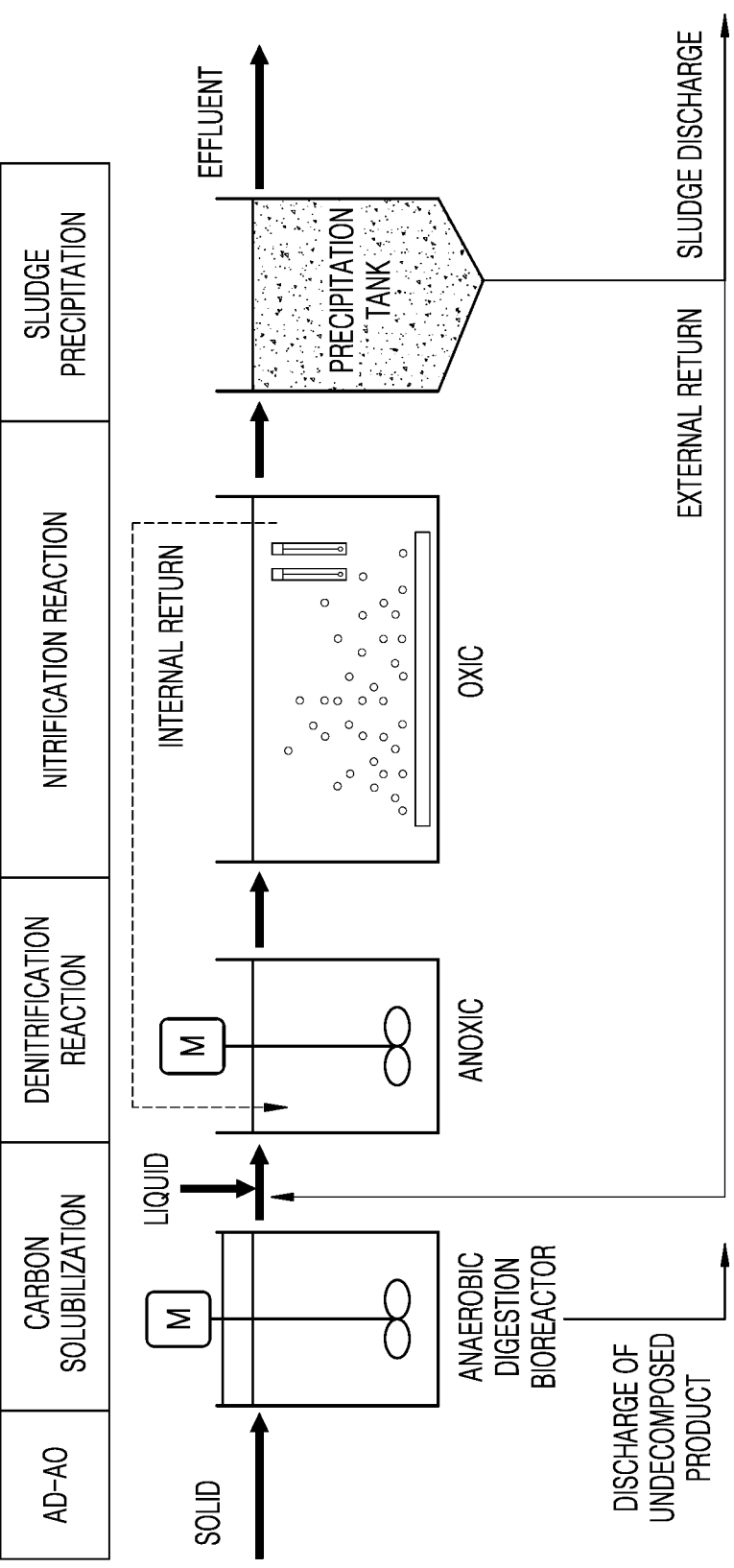
FIG. 7 is a schematic diagram of AD-AO bioreactors.

FIG. 7 is a schematic diagram of the AD-AO bioreactors. As shown in FIG. 7, the AD-AO bioreactors comprise an anaerobic digestion bioreactor, an anoxic bioreactor, an oxic bioreactor, and a precipitation tank. The anaerobic digestion bioreactor may include an inlet for introducing the liquid toilet waste. The anaerobic digestion bioreactor and the anoxic bioreactor may each comprise a stirrer for stirring the liquid toilet waste. The AD bioreactor was connected to the anoxic bioreactor to transport the anaerobically digested liquid toilet waste to the anoxic bioreactor. In addition, the anoxic bioreactor was connected to the oxic bioreactor to transport the anoxic-treated liquid toilet waste to the oxic bioreactor. The oxic bioreactor was connected to the precipitation tank to transport the oxic-treated liquid toilet waste to the precipitation tank. In addition, the oxic bioreactor was connected to the anoxic bioreactor to transport a portion of the oxic-treated liquid toilet waste to the anoxic bioreactor. In addition, the oxic bioreactor comprised an oxygen supplier or air supplier. The precipitation tank was connected to the anoxic bioreactor to externally return the precipitated waste to the anoxic bioreactor. Accordingly, the precipitated waste in the precipitation tank may be externally returned to the anoxic bioreactor. In addition, the precipitation tank was connected to a combustion apparatus to transport the precipitated waste to the combustion apparatus. Accordingly, the precipitated waste in the precipitation tank may be externally transported to the combustion apparatus. As shown in FIG. 7, a carbon solubilization reaction occurred in the anaerobic digestion bioreactor AD, a denitrification reaction occurred in the anoxic bioreactor A, and a nitrification reaction occurred in the oxic bioreactor O.

Table 3 shows the results of evaluating the quality of the effluent discharged from the anaerobic digestion bioreactor AD after 3 months of operation when simulant feces and urine for 10 servings per day were separated into solid and liquid, and the separated liquid was administered to anaerobic digestion bioreactor AD. Here, the temperature of the anaerobic digestion bioreactor AD was 35° C., and the temperature of the oxic bioreactor was 25° C., and the operation lasted for 3 months.

TABLE 3

| Entry | Influent (mg/L) | Effluent (mg/L) | Removal rate (%) | ISO criteria | Note |
|---|---|---|---|---|---|
| TCOD | 8,909 | 334 | 96 | <150 mg/L | Additional ozone treatment required |
| TN | 1,021 | 229 | 78 | >70% | criteria achieved |

In addition, by using the same AD-AO bioreactors and using actual feces and urine instead of the simulant feces and urine, the actual feces and urine were treated according to the same process. The results are shown in Table 4. As shown in Table 4, the COD and TN values were similar or superior to those using the simulant feces and urine.

TABLE 4

| Entry | Influent (mg/L) | Effluent (mg/L) | Removal rate (%) | ISO criteria | Note |
|---|---|---|---|---|---|
| TCOD | 10,775 | 520 | 95 | <150 mg/L | Additional ozone treatment required |
| TN | 1,006 | 212 | 79 | >70% | Criteria achieved |

Figure 8:
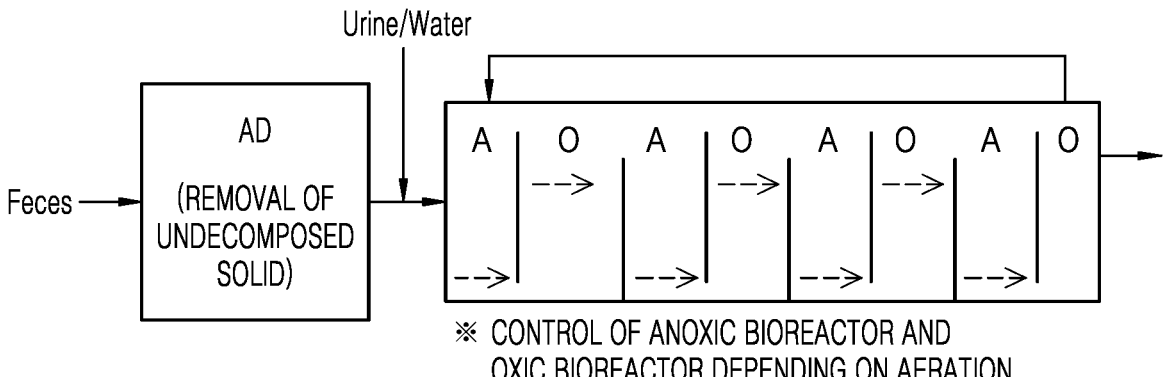
FIG. 8 is a schematic diagram of AD-mAO bioreactors.

FIG. 8 is a schematic diagram of the AD-mAO bioreactors. As shown in FIG. 8, the AD-mAO bioreactors comprises an anaerobic digestion bioreactor and AD and a 4-column subsequent anaerobic and oxic bioreactors. The anaerobic digestion bioreactor may include an inlet for introducing the liquid toilet waste. The anaerobic digestion bioreactor and the anoxic bioreactor may each comprise a stirrer for stirring the liquid toilet waste. The anaerobic digestion bioreactor was connected to the anoxic bioreactor to transport the anaerobically digested liquid toilet waste to the anoxic bioreactor. In addition, the anoxic bioreactor was connected to the oxic bioreactor to transport the anoxic-treated liquid toilet waste to the oxic bioreactor. The oxic bioreactor was connected to an anoxic bioreactor to transport the oxic-treated liquid toilet waste to the anoxic bioreactor installed thereafter.

In addition, the oxic bioreactor arranged at the last was connected to an anoxic bioreactor to transport a portion of the oxic-treated liquid toilet waste to the anoxic bioreactor. In addition, the oxic bioreactor comprised an oxygen supplier or air supplier. In FIG. 8, the anoxic bioreactor is distinguished from the oxic bioreactor according to the amount of dissolved oxygen depending on aeration.

Table 5 shows the results of evaluating the quality of the effluent discharged from the anaerobic digestion bioreactor AD after 2 months of operation when simulant feces and urine for 10 servings per day were used and separated into solid and liquid, and the separated liquid was administered to anaerobic digestion bioreactor AD. Here, the temperature of the anaerobic digestion bioreactor AD was lowered and maintained from 35° C. to 25° C., and the temperature of the oxic bioreactor was 25° C., and the operation lasted for 2 months. In addition, in the oxic bioreactor, a concentration of microorganisms was increased, and a microorganism carrier was contained for stability of the concentration of microorganisms.

TABLE 5

| Entry | Influent (mg/L) | Effluent (mg/L) | Removal rate (%) | ISO criteria | Note |
|---|---|---|---|---|---|
| TCOD | 8,909 | 270 to 340 | 97 | <150 mg/L | Additional ozone treatment required |
| TN | 1,021 | 220 | 78 | >70% | Criteria achieved |

As shown in Tables 3, 4, and 5, when the AD-AO bioreactors and the AD-mAO bioreactors were used and only liquid toilet waste, which was obtained by separation of toilet waste into solid toilet waste and liquid toilet waste, was thrown into the bioreactors for treatment, the COD was about 300 mg/L which was good, but was not included within the ISO 30500 criteria. The TN removal rate was 78%, which was included within the ISO 30500 criteria. Thus, to meet the COD requirements according to ISO 30500 criteria, the effluent is meant to undergo an additional COD reduction process. The COD reduction process may be, for example, ozone treatment or membrane filtration. The ozone treatment was confirmed to have effects of not only sterilization but also COD reduction and turbidity reduction.

Example 2: Biological Treatment Apparatus Containing Ozone Generator and Oxic Bioreactor and Toilet Waste Treatment Using the Same In this example, an ozonation device as a sterilizer was connected to a biological treatment apparatus comprising an oxic bioreactor to prepare a biological treatment apparatus comprising the ozonation device and the oxic bioreactor, and toilet waste was treated by using the same. The biological treatment apparatus comprising the oxic bioreactor used the AD-mAO (m=4) bioreactors described in Example 1, and the ozonation device was arranged to perform ozone treatment on influent transported from the AD-mAO (where m=4) in the ozonation device. The ozonation device comprised an ozone generator and a container for containing or flowing the generated ozone. The container was configured to miniaturize the bubble size of the ozonized air to increase a contact area between ozone and effluent, and was connected to have a countercurrent fluid flow with respect to the direction in which the effluent flows. In addition, the container was configured to have multiple compartments, for example, 5 compartments, in a way that the ozonized air supplied from the ozone generator and the effluent transported from the AD-mAO bioreactors (where m=4) had a countercurrent fluid flow. As the ozone generator, a LAB-I device (power consumption of 180 W) by OzeneTech Inc., was used.

The ozone generator was configured to convert oxygen in the air into ozone by generating high-frequency waves. To reduce the power consumption by the ozone generator, the chromaticity of the effluent and the COD reduction conditions were searched through on/off controls. As a result, the treatment time and energy required to achieve the criteria according to the effluent COD were as shown in Table 5. The chromaticity of the effluent changed from cloudy to clear after ozone treatment.

TABLE 6

| Effluent COD (mg/L) | Target COD (mg/L) | Required removal rate (%) | Treatment time required to achieve criteria (hr/d) | Energy required (kWh/d) |
|---|---|---|---|---|
| 300 | 150 | 50 | 5.3 | 0.95 |
| 350 | 150 | 57 | 9.2 | 1.66 |
| 400 | 150 | 63 | 12 | 2.16 |

Figure 9:
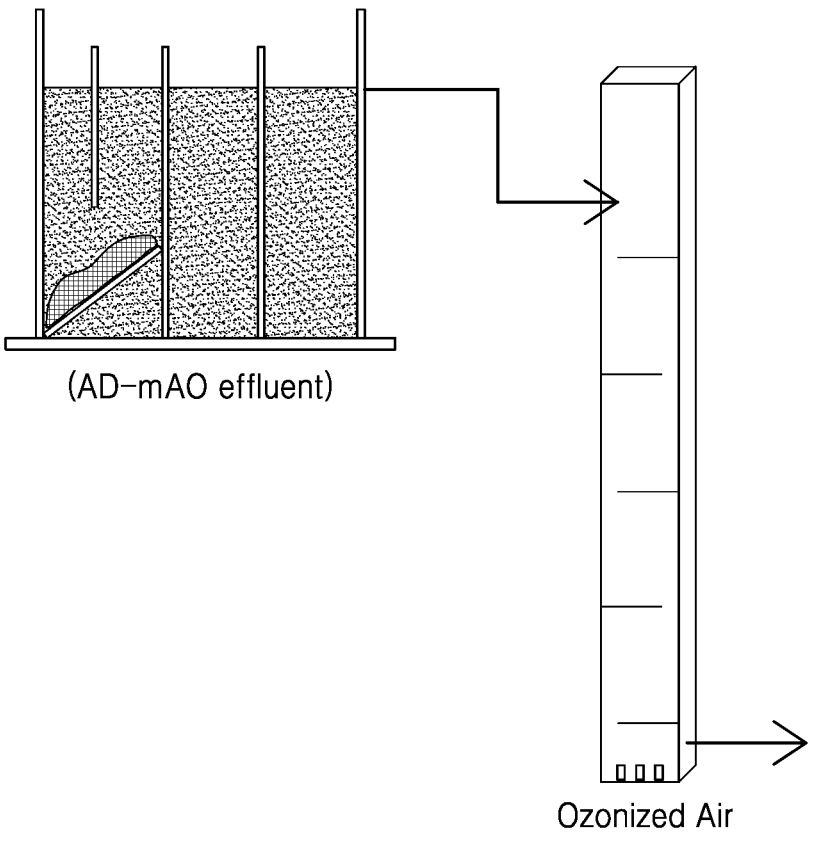
FIG. 9 is a diagram illustrating an ozone generator connected to AD-mAO bioreactors and a process of sterilizing effluent from the AD-mAO bioreactors by using the ozone generator.

As shown in Table 6, when the effluent TCOD was 300 mg/L, 5.3 hours of the device operation was to achieve the target 150 mg/L, and 0.95 kWh/d of power was required. In addition, as the effluent TCOD increased to 350 mg/L and 400 mg/L, the time to achieve the criteria and the energy required increased. These increases indicate that there is a need to lower the effluent COD to save energy. Usually, the sterilization of microorganisms is sufficient only with ozone treatment within 1 hour. In addition, the sterilization of toilet liquid waste through the ozone treatment, the reduction in COD, and the reduction in chromaticity can be increased by the combined use of UV irradiation. In addition, the claimed household toilet waste treatment system can transport solid waste from the biological treatment apparatus, the anaerobic digestion bioreactor, or the solid-liquid separation toilet to the combustion apparatus for drying and combustion. The claimed household toilet waste treatment system can sterilize microorganisms as well as parasites during a solid treatment process. Accordingly, the COD remaining in the toilet liquid waste was reduced. FIG. 9 is a diagram illustrating an ozone generator connected to AD-mAO bioreactors and a process of sterilizing effluent discharged from the AD-mAO bioreactors by using the ozone generator. In FIG. 9, the ozonation device had a container including five compartments for providing the ozonized air generated in the ozonation device in a countercurrent direction with respect to the effluent.

Example 3: Simulation of Toilet Waste Treatment by Using Household Toilet Waste Treatment System The treatment of household toilet waste was simulated for the household toilet waste treatment system having the bioreactor configuration shown in Table 7. This simulation is to confirm that whether claimed household toilet waste treatment system can be miniaturized and achieve the treatment efficiency. The simulation was performed by using a wastewater treatment modeling and a GPS-X a simulation software (Hydromantis Environmental Software Solutions, Inc.). Through the simulation, it was attempted to find a process capable of achieving effluent COD of less than or equal to 150 mg/L and TN and TP removal rates of greater than or equal to 70% and greater than or equal to 80%, respectively, in a bioreactor having a volume within 350 L. The simulation results are as shown in Table 7.

TABLE 7

| | | Process | | | | | | | |
|---|---|---|---|---|---|---|---|---|---|
| | | A2O | Bardenpho | AO | AOA | AD-A2O | | AD-AO | |
| | Scenario | | Basic case | | | Scenario 1 | Scenario 2 | Scenario 2 | Scenario 2 |
| Front end | Solid separation efficiency | | Combined stream | | | 100% | 90% | 90% | 90% |
| | Liquid separation efficiency | | | | | 96% | 80% | 80% | 80% |

TABLE 7-continued

| | | A2O | Bardenpho | AO | AOA | AD-A2O | | AD-AO | |
|---|---|---|---|---|---|---|---|---|---|
| | Scenario | | Basic case | | | Scenario 1 | Scenario 2 | Scenario 2 | Scenario 2 |
| Dewaterer | Dewatering efficiency | No squeezer in process. | | | | 82% | 82% | 82% | 93% |
| | AD-HRT | No anaerobic digestion bioreactor | | | | 5 days | 3 days | 3 days | 3 days |
| Bioreactor volume (L) | Oxic | 380 | 540 | 325 | 344 | 270 | 270 | 237 | 237 |
| | Anaerobic | | | | | 37.5 | 77 | 77 | 77 |
| | Total | 380 | 540 | 325 | 344 | 301 | 347 | 314 | 314 |
| Quality of effluent | COD (mg/L) | 1,623 | 960 | 493 | 544 | 144 | 159 | 157 | 161 |
| | TN (% reduction) | 87 | 87 | 83 | 90 | 85 | 84 | 84 | 83 |
| | TP (% reduction) | 92 | 92 | 60 | 62 | 98 | 98 | 98 | 98 |
| CH$_4$ production (L/day) | | 0 | 0 | 0 | 0 | 0 | 79.0 | 78.6 | 78.6 |
| | Note | No solid-liquid separation efficiency due to treatment without anaerobic digestion bioreactor | | | | | | | |

The solid separation efficiency refers a percentage of the initial feces that undergo without a loss toward a mixed solution containing feces. When a part of the solid toilet waste is lost toward the liquid toilet waste by flush water or urine, the solid separation efficiency is lowered. The liquid separation efficiency refers a percentage of urine or flush water that undergoes without a loss in the initial amount toward a mixed solution. When the liquid toilet waste is mixed with feces and enters the mixed solution containing solids, the liquid separation efficiency decreases. In Table 7, in the AD-A2O or AD-AO process with AD prefix, the liquid that has undergone AD was sent to the dewaterer, and the dewatered liquid and the liquid waste separated from a toilet were mixed and transported to the oxic bioreactor. A sludge precipitate generated in the oxic treatment process was sent to the dewaterer to be mixed with the AD-treated liquid and dewatered.

In Table 7, abbreviations indicate the following meanings. AO: anoxic-oxic process, AOA: anaerobic-oxygen-anoxic process, A2O: anaerobic-anoxic-oxic process, Bardenpho: anoxic-oxygen-anoxic-oxygen process, AD-AO: anaerobic digestion-anoxic-oxygen process, AD-A2O: anaerobic-anaerobic-anoxic-oxygen process; and HRT: hydraulic retention time.

As shown in Table 7, a total of 6 biotreatment processes and 7 solid-liquid separation scenarios were simulated. The 6 biotreatment processes are A2O, 4-stage-bardenpho, AO, AOA, AD-A2O, and AD-AO. First, when toilet waste was treated only by an oxic process without separation into solid toilet waste and liquid toilet waste, COD, TN, and TP did not meet the treatment criteria in all processes reviewed. The processes reviewed include A2O, Bardenpho, AO, and AOA processes.

In addition, toilet waste was separated into solid toilet waste and liquid toilet waste by varying separation rates, and then, a simulation treatment was performed in a way that the separated solid toilet waste was treated through an anaerobic digestion bioreactor (AD) and the separated liquid toilet waste was treated by an oxic treatment process, i.e., A2O or AO process. As a result, in all processes where toilet waste was separated into solid toilet waste and liquid toilet waste, the solid toilet waste was treated in the anaerobic digestion bioreactor and the liquid toilet waste was oxic-treated, the effluent quality criteria were satisfied. With the solid/liquid separation efficiency of Scenario 2, i.e., solid separation efficiency of 90% and liquid separation efficiency of 80%, the effluent quality criteria according to ISO 30500 were also satisfied also in the AD-AO which is the simplest process. That is, by the household toilet waste treatment apparatus including the biological treatment apparatus using a process with an AD-combined oxic bioreactor, e.g., AO, A2O, AOA, etc., the solid-liquid separation toilet, and the dewaterer, the effluent quality criteria according to ISO 30500 can be satisfied. In an example of the household toilet waste treatment system, the solid separation efficiency may be in a range of about 85% to about 95%, and the liquid separation efficiency may be in a range of about 75% to about 85%. In an example of the household toilet waste treatment system, toilet waste can be continuously treated in a system integrated into a household unit without transporting the toilet waste to an external biological treatment apparatus and/or an external anaerobic digestion bioreactor through a pipe. Moreover, in an example of the household toilet waste treatment system, water purified from the toilet waste may be recycled as flush water in the solid separation type toilet. In addition, biogas, such as methane, generated in the anaerobic digestion bioreactor may be used as a fuel in the combustion apparatus.

Figure 10:
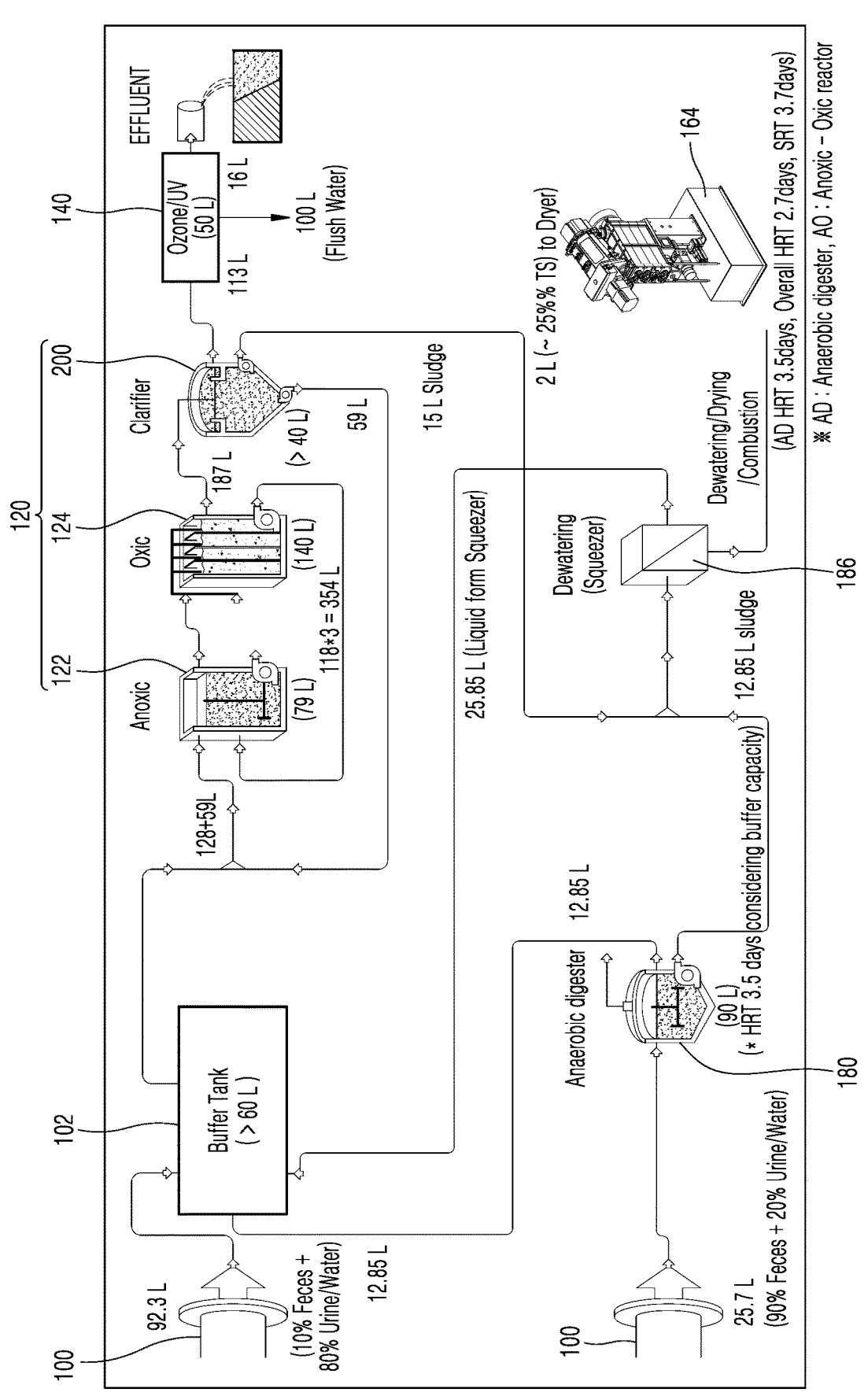
FIG. 10 is a diagram showing the claimed household toilet waste treatment system and illustrating a flowchart of treating toilet waste for 10 servings per day by using the same.

FIG. 10 is a diagram showing the claimed household toilet waste treatment system and illustrating a flowchart of treating toilet waste for 10 servings per day by using the same. As shown in FIG. 10, an example of the household toilet waste treatment system comprises: the solid-liquid separation toilet 100; the biological treatment apparatus 120 including a buffer tank 102, an anoxic bioreactor 122, an oxic bioreactor 124, and a precipitation tank 200; the sterilization apparatus 140; the anaerobic digestion bioreactor 180, the dewaterer 186, and the combustion apparatus 164. Liquids among toilet waste thrown into the solid-liquid separation toilet 110 may be transported to and stored in the buffer tank 102, and a part of the liquids may be introduced to the anoxic bioreactor 122 for anoxic treatment and then transported to the oxic bioreactor. A part of the oxic-treated liquid waste in the oxic bioreactor may be returned to the anoxic bioreactor while another part may be transported to the precipitation tank. The biotreated liquid waste transported to the precipitation tank may be precipitated through precipitation. A portion of the liquid in the precipitation tank may be transported to the sterilization apparatus, sterilized, and then discharged through an outlet. A part of sludge in the precipitation tank 200 may be transported to the front of the anoxic bioreactor, and then transported to the anoxic bioreactor along with the liquid waste transported from the buffer tank. A part of the sludge in the precipitation tank 200 may be transported to the dewaterer 186, dewatered, and then sent to the combustion apparatus 164 for drying and combustion. The combustion apparatus may optionally comprise a dryer. In addition, the dryer may, if present, exist separately and connected to the combustion apparatus.

Solids of the toilet waste thrown into the solid-liquid separation toilet 100 may be transported to the anaerobic digestion bioreactor 180, and liquids that are anaerobically treated and solubilized may be transported to the buffer tank 260. The anaerobic-treated solid waste, i.e., sludge, in the anaerobic digestion bioreactor 180 may be transported to the dewaterer 186, dewatered, and then sent to the combustion apparatus 164 for drying and combustion.

Figure 11:
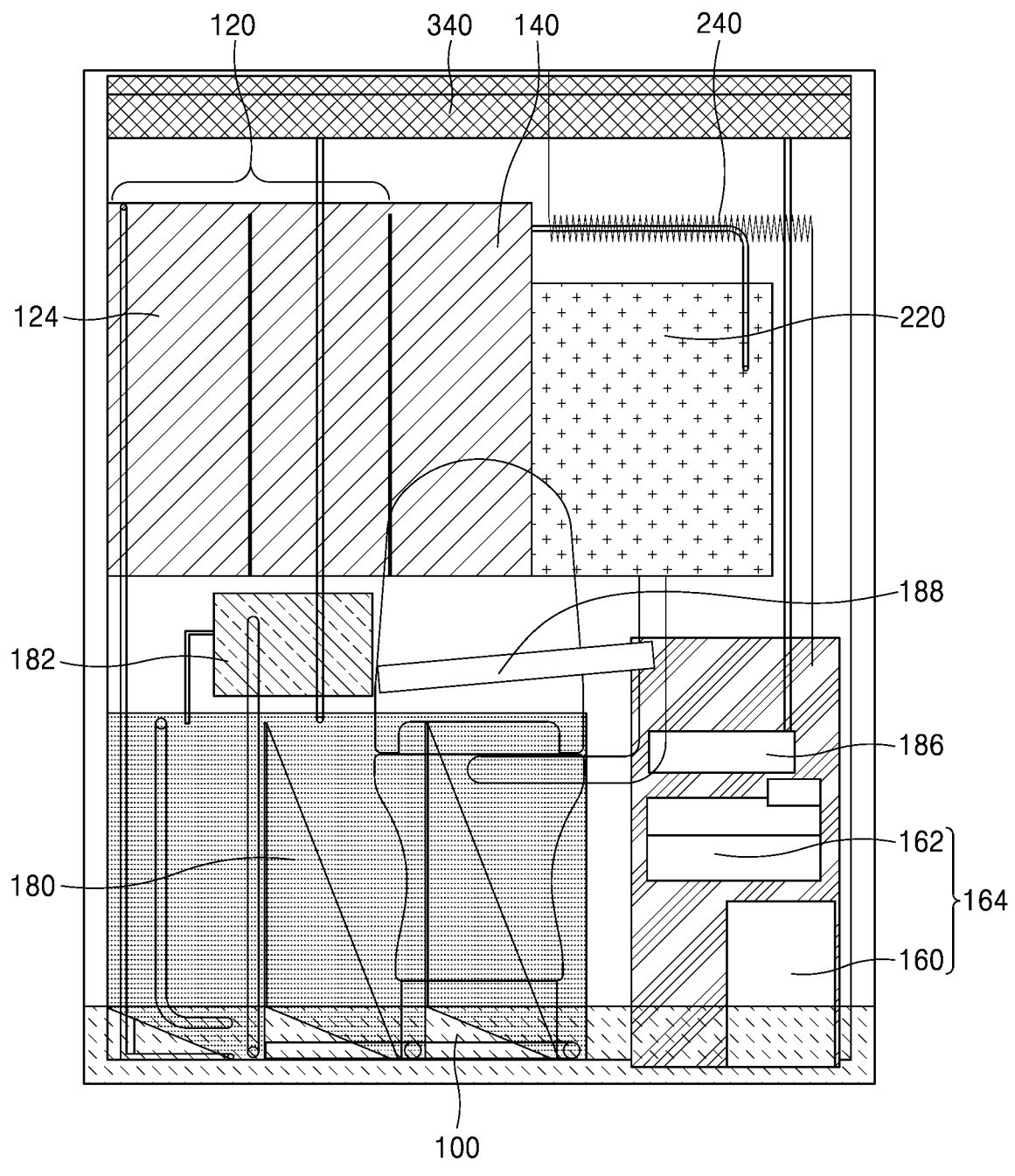
FIG. 11 is a diagram schematically showing an example of the claimed household toilet waste treatment system comprising the anaerobic bioreactor.

FIG. 11 is a diagram schematically showing an example of the claimed household toilet waste treatment system comprising the anaerobic bioreactor. As shown in FIG. 11, an example of the household toilet waste treatment system comprises: the biological treatment apparatus 120 comprising an oxic bioreactor 124; an ozone generator 140 and a UV irradiator 240 as sterilization devices; the solid-liquid separation toilet 100; the anaerobic digestion bioreactor 180; a precipitation tank 182; a transport means 188 (e.g., a transport screw or an auger), a dewaterer 186, a dryer 162, a sub-combustion device 160, a flush water reservoir 220, and a biogas holder 260. The dewaterer 186, the dryer 162, and the sub-combustion device 160 form a single unit and may constitute the combustion apparatus 164. In an example of the household toilet waste treatment system, liquids among the toilet waste thrown into the solid-liquid separation toilet 100 may be sent to the biological treatment apparatus 120 for oxic treatment, and then transported to the sterilization apparatus 140 for sterilization and decolorization and COD removal. Then, the oxic-treated liquid waste may be sent to the flush water reservoir 220 and used as toilet flush water. The solid waste, e.g., sludge, transported from the anaerobic digestion bioreactor 180 and the biological treatment apparatus 120 may be transported to the dewaterer 186 through the transport means 188, dewatered, and then transported to the dryer 162 and the sub-combustion device 160 for drying and combustion. In FIG. 10, the biogas generated in a bioreactor may be stored or maintained in the biogas holder 260, and then transported to the combustion apparatus 164.

Figure 12:
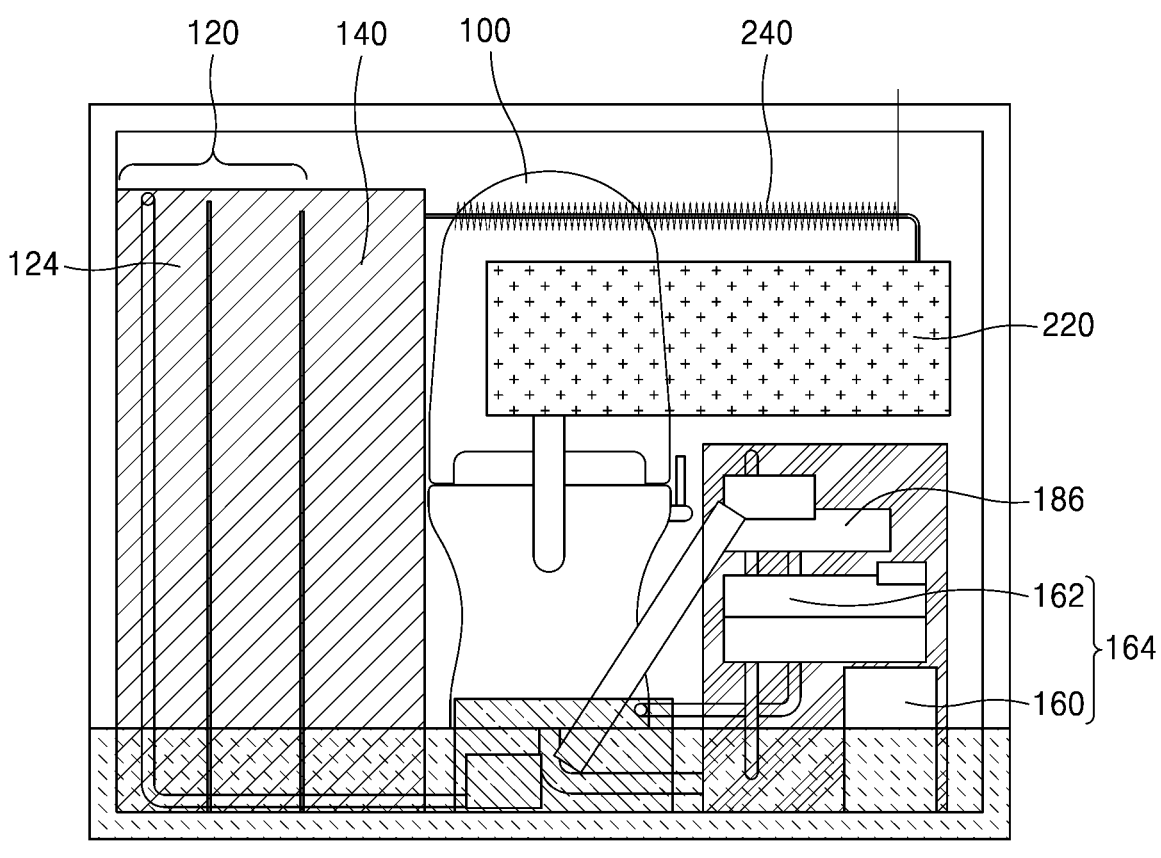
FIG. 12 is a diagram schematically showing another example of the claimed household toilet waste treatment system.

FIG. 12 is a diagram schematically showing another example of the claimed household toilet waste treatment system.

As shown in FIG. 12, an example of the household toilet waste treatment system comprises: the biological treatment apparatus 120 comprising an oxic bioreactor 124; an ozone generator 140 and an ultraviolet irradiator 240 as sterilization devices; the solid-liquid separation toilet 100; the dewaterer 186; the dryer 162; the sub-combustion device 160; the flush water reservoir 220; the transport means 188; and a solid reservoir 158. The solid reservoir 158 may store the solid toilet waste transported from the solid-liquid separation toilet 100 and/or the solids, such as sludge, transported from the biological treatment apparatus 120. The dewaterer 186, the dryer 162, and the sub-combustion device 160 form a single unit and may constitute the combustion apparatus 164. The solid reservoir 158 may comprise a macerator. The stored solids may be transported to the dewaterer 186 through the transport means 188, and then, sent to the dryer 162 and the sub-combustion device 160 for drying and combustion.

The invention claimed is:

1. A household toilet waste treatment system comprising:
   a solid-liquid separation toilet for separating toilet waste into liquid toilet waste and solid toilet waste;
   a biological treater for biologically treating the liquid toilet waste transported from the solid-liquid separation toilet, wherein the biological treater comprises a bioreactor and a precipitation tank for precipitating biotreated toilet waste;
   a sterilizer for sterilizing biotreated liquid waste transported from the biological treater; and
   a combustor for combustion of the solid toilet waste transported from the solid-liquid separation toilet and biotreated solid waste transported from the biological treater,
   wherein the precipitation tank is connected to
   the bioreactor to return a precipitate to the bioreactor, or
   the combustor to transport a precipitate to the combustor.

2. The household toilet waste treatment system of claim 1, wherein the solid-liquid separation toilet comprises a liquid collector for accommodating the liquid toilet waste and a solid collector for accommodating the solid toilet waste.

3. The household toilet waste treatment system of claim 1, wherein the solid-liquid separation toilet is configured to have a solid separation rate of 50% to 100% and a liquid separation rate of 50% to 100%.

4. The household toilet waste treatment system of claim 1, wherein the bioreactor comprises: an anoxic bioreactor (A) and an oxic bioreactor (O); an anoxic bioreactor (A), an oxic bioreactor (O), and an anoxic bioreactor (A); an anaerobic bioreactor, an anoxic bioreactor (A), and an oxic bioreactor (O); an anoxic bioreactor (A), an oxic bioreactor (O), an anoxic bioreactor (A), and an oxic bioreactor (O); an anaerobic bioreactor, an oxic bioreactor (O), an anoxic bioreactor (A), an oxic bioreactor (O), and an anoxic bioreactor (A); an MUCT bioreactor; an UCT bioreactor; a sequencing batch reactor; a partial nitrification bioreactor and an Anammox bioreactor; an Anammox bioreactor; or a combination thereof.

5. The household toilet waste treatment system of claim 1, wherein the bioreactor comprises an anaerobic digestion (AD) bioreactor.

6. A household toilet waste treatment system comprising:
   a solid-liquid separation toilet for separating toilet waste into liquid toilet waste and solid toilet waste,
   a biological treater for biologically treating the liquid toilet waste transported from the solid-liquid separation toilet, wherein the biological treater comprises a first bioreactor that does not comprise an anaerobic digestion (AD) bioreactor and an anaerobic digestion (AD) bioreactor,
   a sterilizer for sterilizing biotreated liquid waste transported from the biological treater, and
   a combustor for combustion of the solid toilet waste transported from the solid-liquid separation toilet and biotreated solid waste transported from the biological treater,
   wherein the AD bioreactor is arranged in the front of the first bioreactor that does not comprise an anaerobic digestion (AD) bioreactor so that the liquid toilet waste transported from the solid-liquid separation toilet can flow into the AD bioreactor, and an organic matter can be solubilized through anaerobic digestion.

7. The household toilet waste treatment system of claim 5, wherein the precipitation tank is connected to the AD bioreactor and precipitates anaerobically digested liquid toilet waste transported from the AD bioreactor.

8. The household toilet waste treatment system of claim 1, wherein the sterilizer comprises an ozone generator, an ultraviolet irradiator, or a combination thereof.

9. The household toilet waste treatment system of claim 1, wherein the combustor further comprises a dryer for drying the toilet waste.

10. The household toilet waste treatment system of claim 1, further comprising a dewaterer for dewatering the solid toilet waste transported from the solid-liquid separation toilet to the combustor, the biotreated solid toilet waste transported from the biological treater to the combustor, or a combination thereof.

11. The household toilet waste treatment system of claim 1, wherein the precipitation tank is connected to the bioreactor to return the precipitate to the bioreactor.

12. The household toilet waste treatment system of claim 1, wherein the biological treater is connected to a water reservoir so that biotreated toilet water can be transported to the water reservoir.

13. A household toilet waste treatment system comprising: a solid-liquid separation toilet for separating toilet waste into liquid toilet waste and solid toilet waste; a biological treater for biologically treating the liquid toilet waste transported from the solid-liquid separation toilet; an anaerobic digestion (AD) bioreactor for biologically treating the solid toilet waste transported from the solid-liquid separation toilet under anaerobic conditions; a sterilizer for sterilizing biotreated liquid waste transported from the biological treater; and a combustor for combustion of anaerobically digested solid toilet waste transported from the anaerobic digestion bioreactor and biotreated solid toilet waste transported from the biological treater.

14. The household toilet waste treatment system of claim 13, wherein the biological treater further comprises a precipitation tank for precipitating biotreated toilet waste, and wherein the precipitation tank is connected to a bioreactor of the biological treater to return a precipitate to the bioreactor, or is connected to the combustor to transport a precipitate to the combustor.

15. The household toilet waste treatment system of claim 13, further comprising a solid-liquid separation bioreactor for separating the anaerobically digested solid toilet waste transported from the AD bioreactor into solid waste and liquid waste, wherein the AD bioreactor is connected to the solid-liquid separation bioreactor to transport the anaerobically digested solid toilet waste to the solid-liquid separation bioreactor.

16. The household toilet waste treatment system of claim 15, wherein the solid-liquid separation bioreactor is connected to the combustor so that the solid waste can be transported to the combustor.

17. The household toilet waste treatment system of claim 13, wherein the AD bioreactor is connected to the biological treater so that liquid components of the anaerobically digested solid toilet waste can be transported to the biological treater.

18. The household toilet waste treatment system of claim 13, further comprising a solid-liquid separation bioreactor for separating the anaerobically digested solid toilet waste transported from the AD bioreactor into solid waste and liquid waste, wherein the AD bioreactor is connected to the solid-liquid separation bioreactor to transport the anaerobically digested solid toilet waste to the solid-liquid separation bioreactor, and the solid-liquid separation bioreactor is connected to the biological treater to transport liquid components of the anaerobically digested solid toilet waste to the biological treater.

19. A method of treating toilet waste, the method comprising throwing toilet waste into a solid-liquid separation toilet of the household toilet waste treatment system of claim 1.

20. A method of treating toilet waste, the method comprising throwing toilet waste into a solid-liquid separation toilet of a household toilet waste treatment system, wherein the household toilet waste treatment system comprises: a solid-liquid separation toilet for separating toilet waste into liquid toilet waste and solid toilet waste; a biological treater for biologically treating the liquid toilet waste transported from the solid-liquid separation toilet; an anaerobic digestion (AD) bioreactor for biologically treating the solid toilet waste transported from the solid-liquid separation toilet under anaerobic conditions; a sterilizer for sterilizing the biotreated liquid waste transported from the biological treater; and a combustor for combustion of the anaerobically digested solid toilet waste transported from the anaerobic digestion bioreactor and the biotreated solid toilet waste transported from the biological treater.

* * * * *